(12) United States Patent
Shock et al.

(10) Patent No.: US 10,752,323 B1
(45) Date of Patent: Aug. 25, 2020

(54) MARINE DISTRIBUTION VESSEL CONFIGURATION

(71) Applicants: Ricky Dean Shock, Victoria, TX (US); Brayden Gregory Berson, Harrison Charter Township, MI (US); Jonathan H. Brown, Humble, TX (US); Frederick McKenzie Dyson, Royal Oak, MI (US)

(72) Inventors: Ricky Dean Shock, Victoria, TX (US); Brayden Gregory Berson, Harrison Charter Township, MI (US); Jonathan H. Brown, Humble, TX (US); Frederick McKenzie Dyson, Royal Oak, MI (US)

(73) Assignee: Fuel Automation Station, LLC, Birmingham, MI (US)

( * ) Notice: Subject to any disclaimer, the term of this patent is extended or adjusted under 35 U.S.C. 154(b) by 0 days.

(21) Appl. No.: 16/576,957

(22) Filed: Sep. 20, 2019

Related U.S. Application Data

(60) Provisional application No. 62/846,045, filed on May 10, 2019.

(51) Int. Cl.
| | |
|---|---|
| *B63B 25/08* | (2006.01) |
| *B63B 35/28* | (2006.01) |
| *B63B 27/24* | (2006.01) |
| *B63B 27/34* | (2006.01) |
| *B63B 17/00* | (2006.01) |

(52) U.S. Cl.
CPC ............. *B63B 25/08* (2013.01); *B63B 27/24* (2013.01); *B63B 27/34* (2013.01); *B63B 35/28* (2013.01); *B63B 17/0027* (2013.01); *B63B 2025/087* (2013.01)

(58) Field of Classification Search
CPC ......... B63B 25/08; B63B 27/24; B63B 27/34; B63B 35/28; B63B 17/0027; B63B 2025/087
USPC ......................................................... 141/231
See application file for complete search history.

(56) References Cited

U.S. PATENT DOCUMENTS

| | | | | |
|---|---|---|---|---|
| 5,349,980 | A * | 9/1994 | Spiegel ..................... | B60P 3/14 137/1 |
| 6,382,272 | B1 * | 5/2002 | Dahlin ..................... | B60P 3/14 137/351 |
| 6,463,967 | B1 * | 10/2002 | Boyle .................. | B67D 7/3209 141/100 |

(Continued)

*Primary Examiner* — Timothy L Maust
(74) *Attorney, Agent, or Firm* — Carlson, Gaskey & Olds, P.C.

(57) ABSTRACT

A marine distribution vessel includes a barge that fuel tanks and lubricant tanks, and a distribution station disposed on the barge and connected with the fuel tanks and the lubricant tanks. The distribution station includes a fuel pump and a fuel line that connects the fuel tanks with the fuel pump, a lubricant pump and lubricant lines that connect the lubricant tanks with the lubricant pump, a fuel flow meter disposed in the fuel line, an automated fuel valve disposed in the fuel line, a lubricant flow meter disposed in the lubricant lines, automated lubricant valves disposed in the lubricant lines, and a computerized controller electrically connected with the fuel flow meter, the lubricant flow meter, the automated fuel valve, the automated lubricant valves, the fuel pump, and the lubricant pump.

29 Claims, 14 Drawing Sheets

(56) References Cited

U.S. PATENT DOCUMENTS

| | | | | |
|---|---|---|---|---|
| 6,568,436 | B1* | 5/2003 | Matthews | F01M 11/04 |
| | | | | 141/192 |
| 8,164,302 | B2* | 4/2012 | Capizzo | B60K 15/063 |
| | | | | 320/109 |
| 8,286,678 | B2* | 10/2012 | Adkins | B63B 22/026 |
| | | | | 141/387 |
| 8,342,199 | B2* | 1/2013 | Deline | B67D 7/16 |
| | | | | 137/1 |
| 8,740,251 | B2* | 6/2014 | Batson | B64F 1/28 |
| | | | | 137/355.16 |
| 10,087,065 | B2* | 10/2018 | Shock | B67D 7/465 |
| 2006/0272740 | A1* | 12/2006 | Poulter | B60P 3/2245 |
| | | | | 141/231 |
| 2011/0139811 | A1* | 6/2011 | Mitropoulos | B67D 7/74 |
| | | | | 141/9 |
| 2011/0197988 | A1* | 8/2011 | Van Vliet | B67D 7/04 |
| | | | | 141/1 |
| 2014/0261882 | A1* | 9/2014 | Lambrix | B67D 7/04 |
| | | | | 141/94 |
| 2014/0319906 | A1* | 10/2014 | Grimm, III | B63B 35/28 |
| | | | | 307/9.1 |
| 2018/0025345 | A1* | 1/2018 | Kittoe | G06Q 20/24 |
| | | | | 705/41 |

* cited by examiner

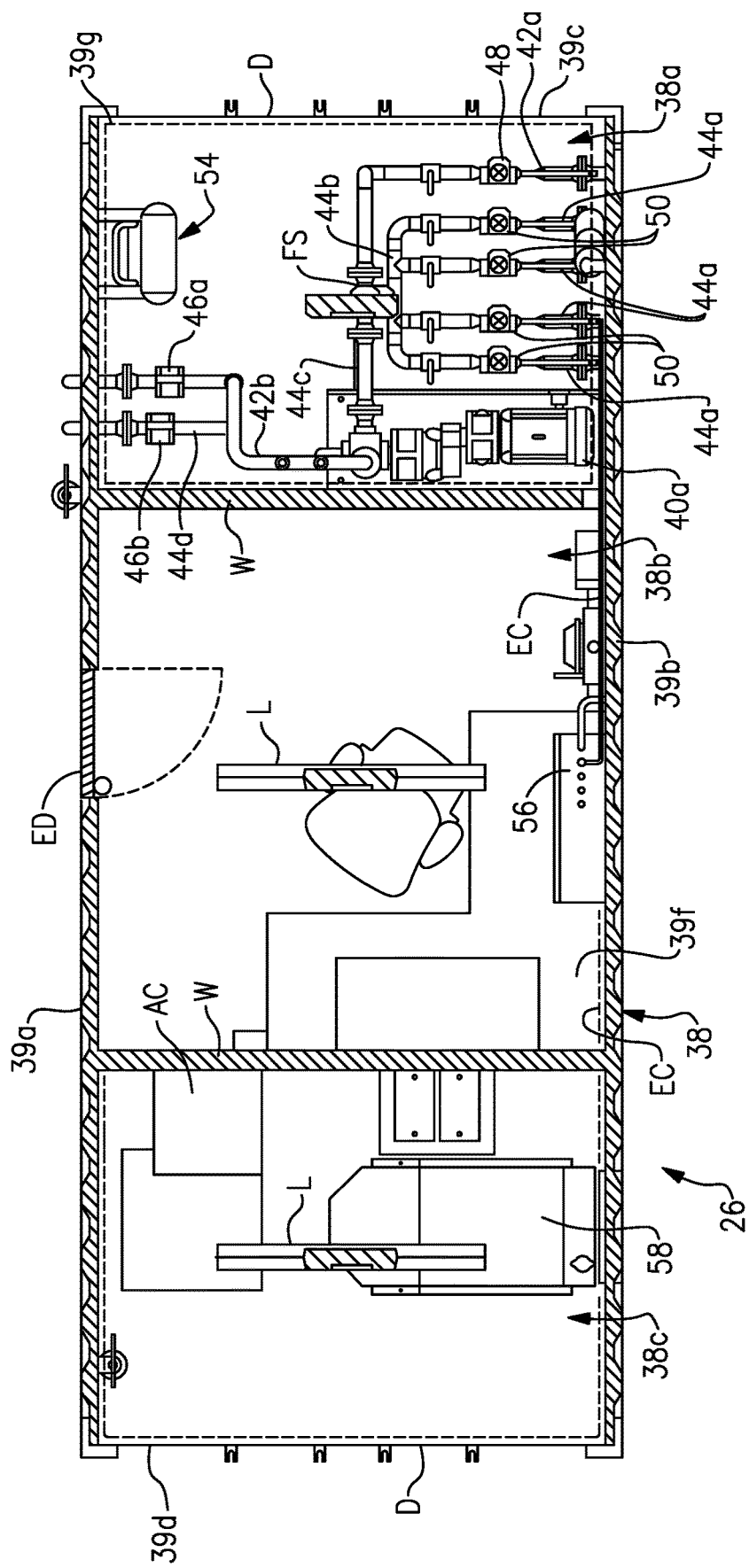

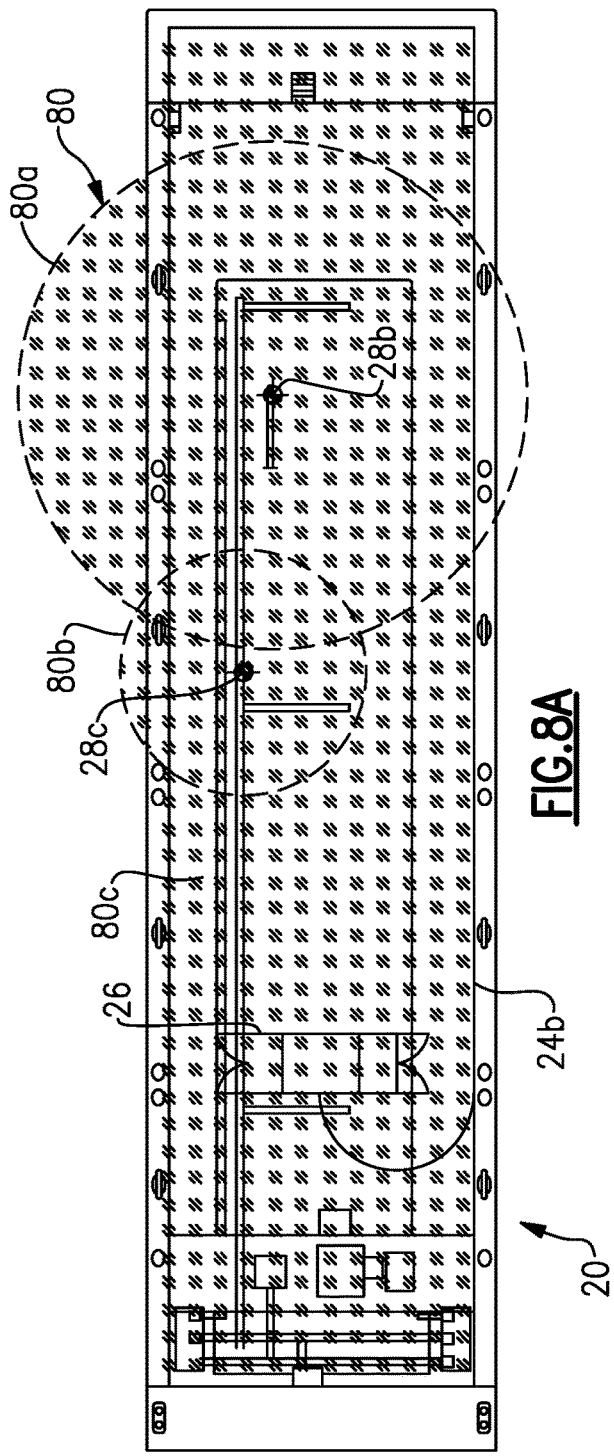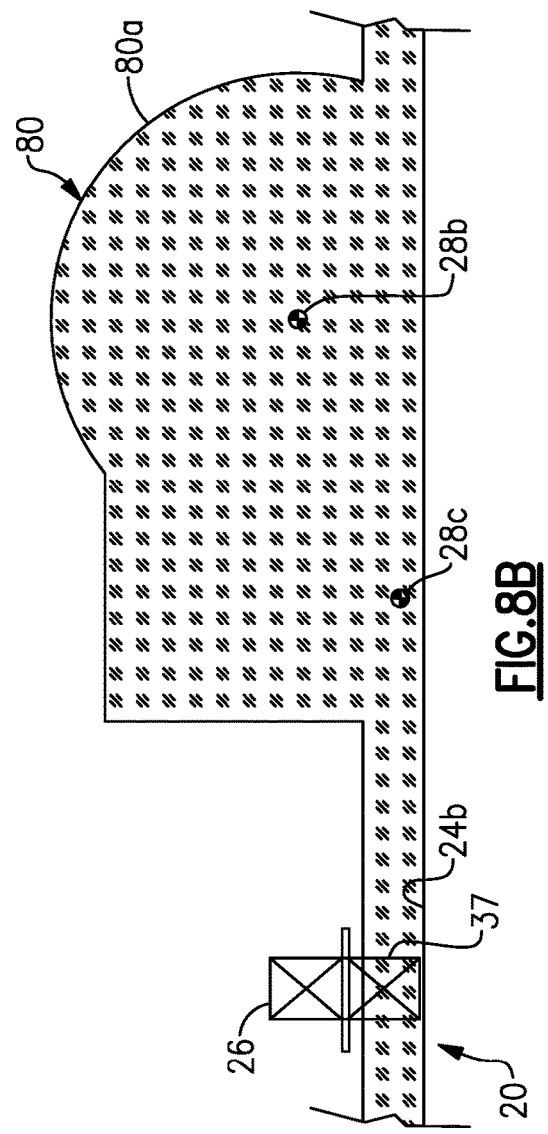

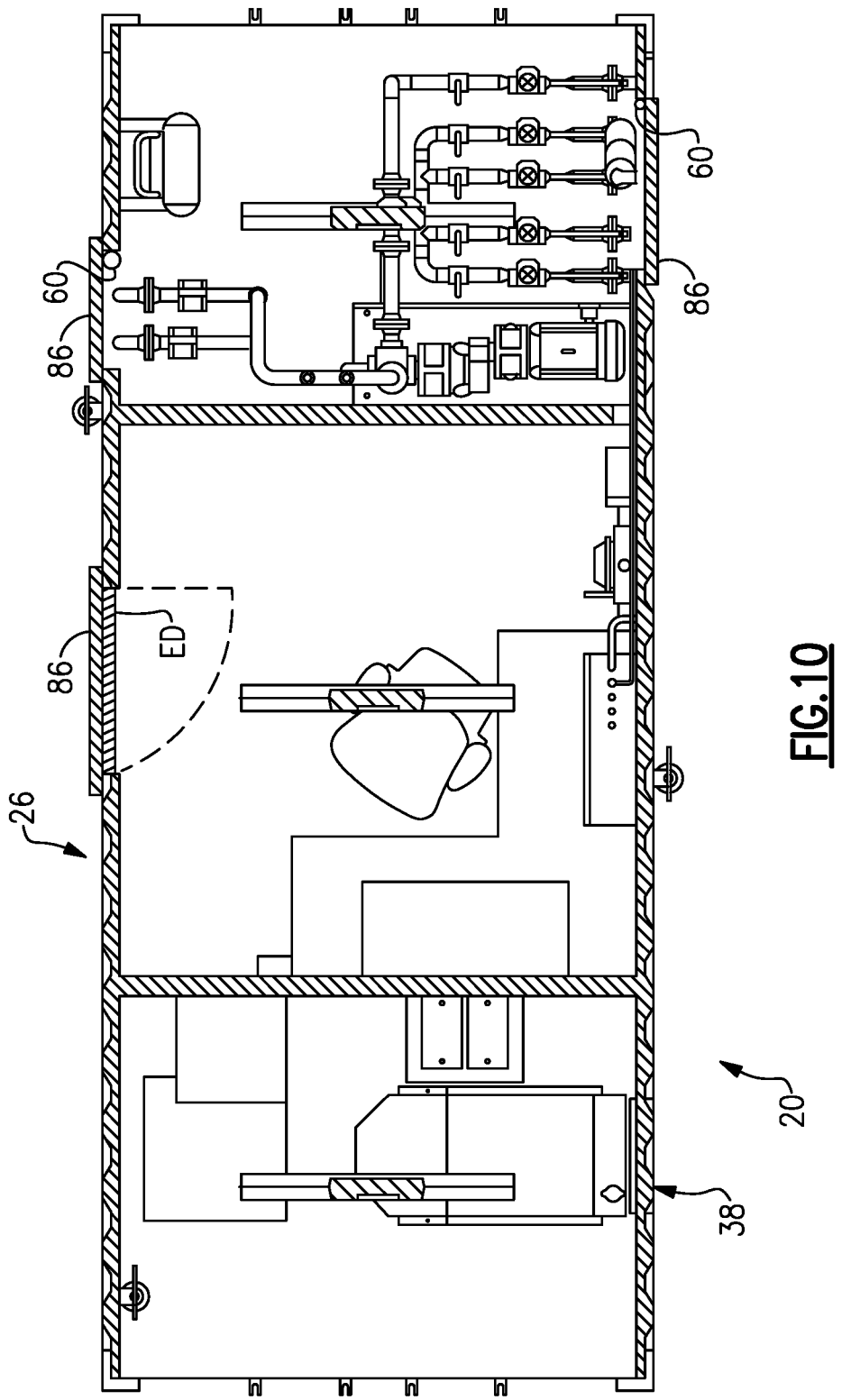

MARINE DISTRIBUTION VESSEL CONFIGURATION

CROSS-REFERENCE TO RELATED APPLICATION

This application claims priority to U.S. Provisional Application No. 62/846,045 filed May 10, 2019.

BACKGROUND

Engine-powered marine vessels utilize fuels, such as fuel oils. Refueling such vessels, however, can be challenging. Marinas and seaports often have terrestrial refueling systems. Such a system may include an onshore fuel tank and a network of pipes and/or hoses. Depending on the size of the vessel and location of the system, it may be difficult for the vessel to physically access the refueling system, and some systems may be altogether inaccessible. Alternatively, a vessel may be refueled using a refueling truck. The refueling truck has a large fuel tank and may in some instances be able to access the vessel near its point of docking. Despite this greater degree of accessibility, it may still be necessary to run hoses from the truck across the dock to the vessel, increasing the potential for accidental spillage or logistic complications. To complicate matters further, the vessel may also require other liquids, such as engine lubricants, potable water, and the like. Lubricants and water may be provided manually or require access to/from additional supply systems. As a result, preparing the vessel for voyage may be costly, time-consuming, and location-limited.

SUMMARY

A marine distribution vessel according to an example of the present disclosure includes a barge that has a plurality of fuel tanks and a plurality of lubricant tanks, and a distribution station that is disposed on the barge and connected with the fuel tanks and the lubricant tanks. The distribution station has a fuel pump and a fuel line connecting the fuel tanks with the fuel pump, a lubricant pump and lubricant lines connecting the lubricant tanks with the lubricant pump, a fuel flow meter disposed in the fuel line, an automated fuel valve disposed in the fuel line, a lubricant flow meter disposed in the lubricant lines, a plurality of automated lubricant valves disposed in the lubricant lines, and a computerized controller that is electrically connected with the fuel flow meter, the lubricant flow meter, the automated fuel valve, the automated lubricant valves, the fuel pump, and the lubricant pump.

In a further embodiment of any of the foregoing embodiments, the lubricant lines include a plurality of inlet lines upstream of the lubricant pump, and the automated lubricant valves are disposed in the inlet lines.

In a further embodiment of any of the foregoing embodiments, the lubricant lines further include a first manifold connected with the inlet lines, and the manifold is downstream of the automated lubricant valves and upstream of the lubricant pump.

In a further embodiment of any of the foregoing embodiments, the lubricant lines further include a single connector line to which the first manifold is connected, and the connector line is connected to an upstream side of the lubricant pump.

In a further embodiment of any of the foregoing embodiments, the lubricant lines further include an outlet line connected to a downstream side of the lubricant pump, and the lubricant flow meter is disposed in the outlet line.

A further embodiment of any of the foregoing embodiments includes a lubricant drop line connected with the outlet line, a reel manifold connected with the lubricant drop line, reel outlet lines connected off of the reel manifold, hose reels connected with the reel outlet lines, and lubricant hoses connected with the hose reels.

In a further embodiment of any of the foregoing embodiments, the lubricant lines further include a second manifold connected with the outlet line.

The marine distribution vessel as recited in claim 7, wherein at least one of the automated lubricant valves is disposed in the second manifold.

In a further embodiment of any of the foregoing embodiments, the lubricant lines further include manifold outlet lines connected off of the second manifold, and at least one of the automated lubricant valves is disposed in at least one of the manifold outlet lines.

In a further embodiment of any of the foregoing embodiments, at least two of the automated lubricant valves are disposed in the second manifold.

In a further embodiment of any of the foregoing embodiments, the lubricant lines further include manifold outlet lines connected off of the second manifold, and at least two of the automated lubricant valves are disposed in different ones of the manifold outlet lines.

In a further embodiment of any of the foregoing embodiments, the computerized controller is configured to open and close the automated lubricant valves to isolate any individual one of the manifold outlet lines for lubricant flow.

In a further embodiment of any of the foregoing embodiments, the distribution station further includes an air compressor and an distributor electrically connected with the computerized controller and with the air compressor, and the automated fuel valve and the automated lubricant valves are pneumatic valves the are connected by air lines with the air distributor.

A marine distribution vessel according to an example of the present disclosure includes a barge that has a plurality of fuel tanks and a plurality of lubricant tanks, and a distribution station that is disposed on the barge and connected with the fuel tanks and the lubricant tanks. The distribution station includes a fuel pump and a fuel line connecting the fuel tanks with the fuel pump, and a lubricant pump and lubricant lines connecting the lubricant tanks with the lubricant pump. The lubricant lines have a first manifold upstream of the lubricant pump, a second manifold downstream of the lubricant pump, and a plurality of manifold outlet lines connected off of the second manifold. A fuel flow meter is disposed in the fuel line. An automated fuel valve is disposed in the fuel line. A lubricant flow meter is disposed in the lubricant lines. A plurality of automated lubricant valves are disposed in the lubricant lines. At least a portion of the automated lubricant valves are disposed downstream of the lubricant pump. A computerized controller is electrically connected with the fuel flow meter, the lubricant flow meter, the automated fuel valve, the automated lubricant valves, the fuel pump, and the lubricant pump. There is a plurality of lubricant hoses connected downstream of the manifold outlet lines.

In a further embodiment of any of the foregoing embodiments, the lubricant lines include a plurality of inlet lines upstream of the lubricant pump, and a portion of the automated lubricant valves are disposed in the inlet lines.

In a further embodiment of any of the foregoing embodiments, the lubricant lines further include an outlet line connected to a downstream side of the lubricant pump, and the lubricant flow meter is disposed in the outlet line.

In a further embodiment of any of the foregoing embodiments, at least one of the automated lubricant valves is disposed in the second manifold.

In a further embodiment of any of the foregoing embodiments, at least one of the automated lubricant valves is disposed in at least one of the manifold outlet lines.

In a further embodiment of any of the foregoing embodiments, at least one of the automated lubricant valves is disposed in the second manifold, and at least one of the automated lubricant valves is disposed in at least one of the manifold outlet lines.

In a further embodiment of any of the foregoing embodiments, the computerized controller is configured to open and close the automated lubricant valves to isolate any individual one of the manifold outlet lines for lubricant flow.

A marine distribution vessel according to an example of the present disclosure includes a barge that has a plurality of fuel tanks and a plurality of lubricant tanks, and a distribution station that is disposed on the barge and connected with the fuel tanks and the lubricant tanks. The distribution station includes a fuel dispensing system connected with the fuel tanks and a lubricant dispensing system connected with the lubricant tanks. The fuel dispensing system is fluidly isolated from the lubricant dispensing system. The fuel dispensing system includes a fuel pump and a fuel line that connects the fuel tanks with the fuel pump, a fuel flow meter disposed in the fuel line, and an automated fuel valve disposed in the fuel line. The lubricant dispensing system has a lubricant pump and lubricant lines that connect the lubricant tanks with the lubricant pump, a lubricant flow meter disposed in the outlet line, a plurality of automated lubricant valves disposed in the inlet lines, and a computerized controller that is electrically connected with the fuel dispensing system and the lubricant dispensing system. The computerized controller is configured to dispense fuel and lubricant on-demand to patron marine vessels and track amounts of fuel and lubricant dispensed.

In a further embodiment of any of the foregoing embodiments, the lubricant lines include a plurality of lubricant inlet lines upstream of the lubricant pump, a manifold connected with the lubricant inlet lines, and a lubricant outlet line connected to a downstream side of the lubricant pump.

In a further embodiment of any of the foregoing embodiments, the lubricant outlet line includes at least one of a pressure sensor in electric communication with the computerized controller or a temperature sensor in electric communication with the computerized controller.

In a further embodiment of any of the foregoing embodiments, the computerized controller is configured to de-activate the lubricant pump in response to a pressure or temperature that exceeds, respectively, a pre-designated threshold pressure or temperature.

In a further embodiment of any of the foregoing embodiments, the fuel line includes a fuel outlet line connected to a downstream side of the fuel pump, and the fuel outlet line includes at least one of a pressure sensor in electric communication with the computerized controller or a temperature sensor in electric communication with the computerized controller.

In a further embodiment of any of the foregoing embodiments, the computerized controller is configured to de-activate the fuel pump in response to a pressure or temperature that exceeds, respectively, a pre-designated threshold pressure or temperature.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2A illustrates a sectioned overhead view of a distribution station of the marine distribution vessel.

FIG. 8A is an overhead view of a marine distribution vessel showing a spatial region and a distribution station that is outside of the spatial region.

FIG. 8B is a side view of the marine distribution vessel and spatial region of FIG. 8A.

FIG. 10 illustrates a distribution station in a cargo-worthy state.

DETAILED DESCRIPTION

Figure 1A:
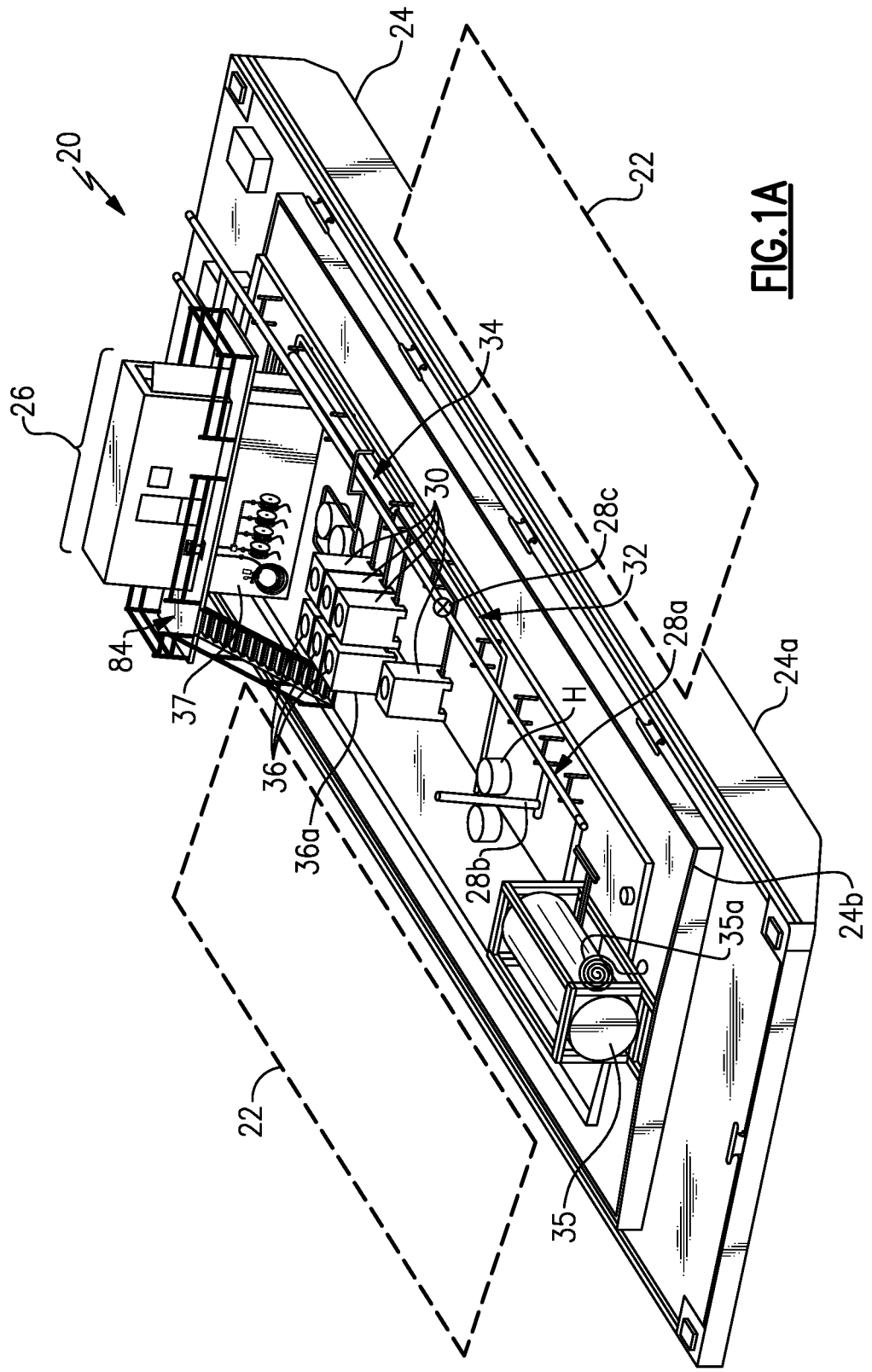
FIG. 1A illustrates an example marine distribution vessel.
Figure 1B:
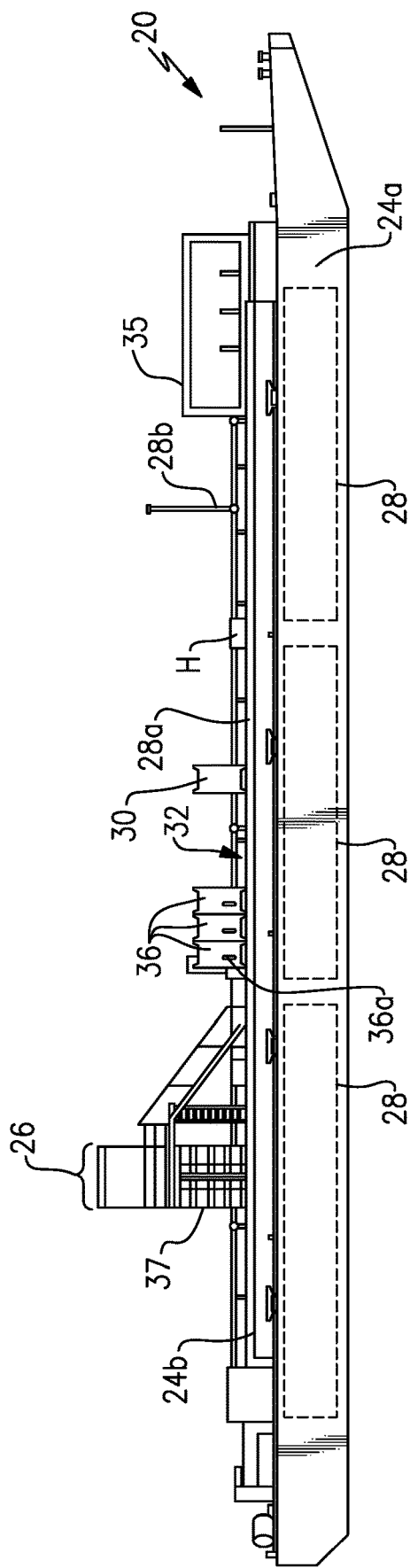
FIG. 1B illustrates a side view of the marine distribution vessel.
Figure 1C:
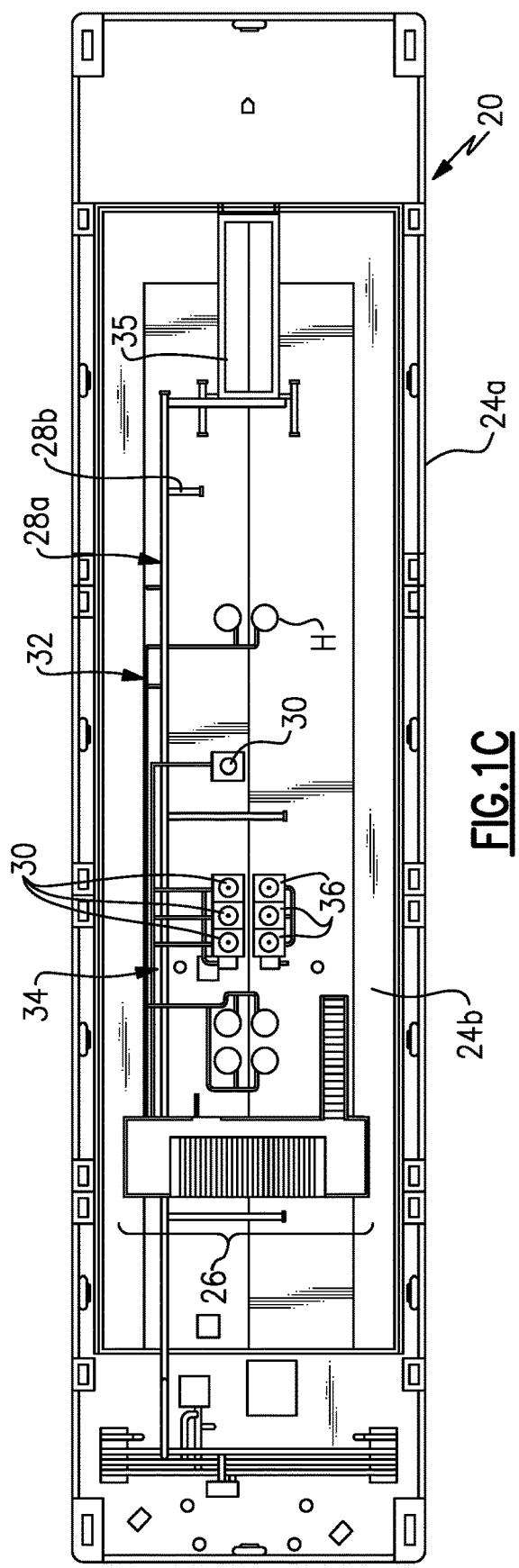
FIG. 1C illustrates an overhead view of the marine distribution vessel.

FIG. 1A illustrates a marine distribution vessel 20 ("vessel 20"), FIG. 1B illustrates a side view of the vessel 20, and FIG. 1C illustrates an overhead view of the vessel 20. As will be described, the vessel 20 is a full service vessel that is configured to deliver fuel and/or lubricants to patron marine vessels 22 alongside the vessel 20 and track the amount of fuel and lubricants delivered. The vessel 20 may also provide potable water and take on sludge oil from the patron marine vessels 22.

The vessel 20 generally includes a barge 24 and a distribution station 26 disposed on the barge 24. The barge 24 is water-buoyant and is transportable to such locations as points-of-sale at the location of the patron marine vessels 22, marinas, harbors, seaports, and temporary locations in waterways at which patron marine vessels 22 may access the barge 24.

The barge 24 is comprised of a hull 24a and a deck 24b. The hull 24a is generally a flat-bottom hull. In the illustrated example, the barge 24 is non-self-propelled. In this regard, the barge 24 may be pulled or pushed by another, self-powered vessel, such as a tugboat. The barge 24 may be provided in a variety of different sizes but is generally 100 feet or more in length and 30 feet or more in width. As an example, the illustrated barge 24 has a length of approximately 200 feet and a width of approximately 45 feet. In modified designs, the barge 24 may have a length of approximately 150 feet and a width of approximately 40 feet. The dimensions, however, are not particularly limited and other barge sizes may alternatively be used.

The barge 24 includes at least one fuel tank 28 and at least one lubricant tank 30. In the illustrated example, the barge 24 includes six fuel tanks 28 and the fuel tanks 28 are within the interior of the barge 24, which facilitates providing a large amount of storage space for fuel oil and also keeps the deck 24*b* clear. For containment purposes, the fuel tanks 28 may be double-walled. The fuel tanks 28 hold fuel that is to be dispensed to the patron marine vessels 22. For example, the fuel may be, but is not limited to, ultra-low or low sulfur diesel fuel, other types of diesel fuel, bunkering fuel, gasoline, or methanol. Although not particularly limited, as an example, the fuel tanks 28 may each have a capacity of 1000-5000 barrels. The fuel tanks 28 may be further equipped with a ventilation system 28*a*, including a piping network having a vent 28*b* and pressure release valve 28*c*. As will be appreciated, the examples herein may be modified to have fewer fuel tanks 28 or additional fuel tanks 28.

In the illustrated example, the barge 24 also includes four lubricant tanks 30 that are located on the deck 24*b*. Here, at least several of the lubricant tanks 30 are provided in a bank of lubricant tanks 30, side-by-side. Having the lubricant tanks 30 on the deck 24*b* facilitates ready access to the lubricant tanks 30. Although not particularly limited, as an example, the lubricant tanks 30 may each have a capacity of 200-1000 gallons. As will be appreciated, the examples herein may be modified to have fewer lubricant tanks 30 or additional lubricant tanks 30. The lubricant tanks 30 may hold different types and/or different brands of lubricants, such as engine oils developed for use in marine diesel engines. Although not particularly limited the lubricants will typically have kinematic viscosities at 40° C. of approximately 100-200 mm$^2$/s (ASTM D445) and densities at 15° C. below 0.9 kg/l (ASTM D4052).

The barge 24 further includes a fuel supply line network 32 and a lubricant supply line network 34. The networks 32/34 may include hard piping that connects, respectively, the fuel tanks 28 and the lubricant tanks 30 with the distribution station 26. As will be appreciated, the networks 32/34 may include various types of valves to facilitate supply of fuel and lubricant from the tanks 28/30 to the distribution station 26.

In the illustrated example, the barge 24 additionally includes one or more hatches H for accessing the fuel tanks 28, a water tank 35, and at least one sludge oil tank 36. The water tank 35 may include a hose 35*a* for delivering potable water to the patron vessels 22. Although not particularly limited, as an example, the water tank 35 may have a capacity of 5000-10000 gallons. The sludge oil tank(s) 36 may be of the same or similar size and construction as the lubricant tanks 30 and may be configured to receive sludge oil from the patron marine vessels 22. In this regard, the sludge oil tanks 36 may include one or more intake lines or ports 36*a*.

Figure 2B:
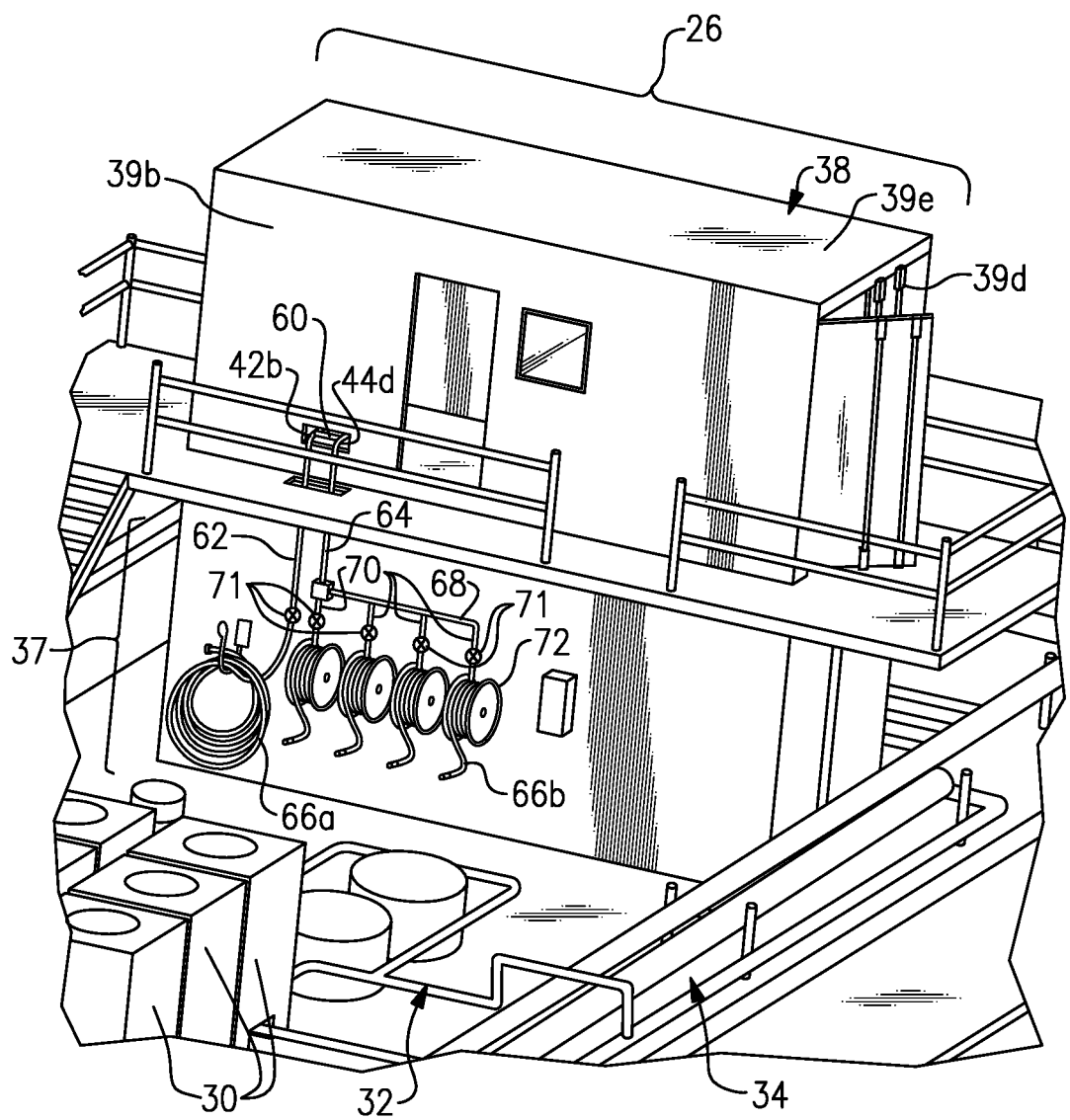
FIG. 2B illustrates a magnified view of a portion of the marine distribution vessel, namely the distribution station.

Turning to the distribution station 26, the station 26 is mounted on the barge 24. For reasons explained in further detail below, in the illustrated example, the distribution station 26 is elevated above the deck 24*b*. As an example, the distribution station 26 is mounted on a spacer container 37. A sectioned, overhead view of the distribution station 26 is shown in FIG. 2A and a magnified view of the distribution station 26 on the barge 24 is shown in FIG. 2B. The distribution station 26 includes a container 38. The container 38 may be formed of steel and generally includes first and second sides 39*a*/39*b*, first and second ends 39*c*/39*d*, a top 39*e*, and a floor 39*f*. The container 38 may be thermally insulated or non-insulated as may be appropriate for the expected operating environment. Although not limited, in one example, the container 38 may be what is known as a shipping or freight container, which may be modified from its original construction into the design of the distribution station 26. The ends 39*c*/39*d* may have doors D that can be opened and closed to provide access to the interior of the container 38. The side 39*a* may also include an entry door ED. Although not shown, the container 38 may also include one or more small windows.

As shown in FIG. 2A, the container 38 in this example may be partitioned into several compartments, including a first compartment 38*a*, a second compartment 38*b*, and a third compartment 38*c*. The compartments 38*a*/38*b*/38*c* are divided by walls W, which provide a hermetic seal between the compartments 38*a*/38*b*/38*c* such that air, moisture, or vapors cannot exchange between compartments. Communication cables, power cables, and the like may extend through the walls W but are sealed thereabout to maintain hermetic sealing between the compartments 38*a*/38*b*/38*c*. One or more of the compartments 38*a*/38*b*/38*c* may include a floor liner 39*g*, such as a drip pan.

The compartments 38*a*/38*b*/38*c* may be functionally designated. For example, the compartment 38*a* is an industrial compartment, compartment 38*b* is an office compartment, and compartment 38*c* is a generator compartment. In this example, the office compartment is between the industrial compartment and the generator compartment. The industrial compartment and the generator compartment are accessible by the doors D, and the office compartment is accessible by the entry door ED. Thus, each compartment 38*a*/38*b*/38*c* is accessible from the exterior of the container 38.

Figure 3A:
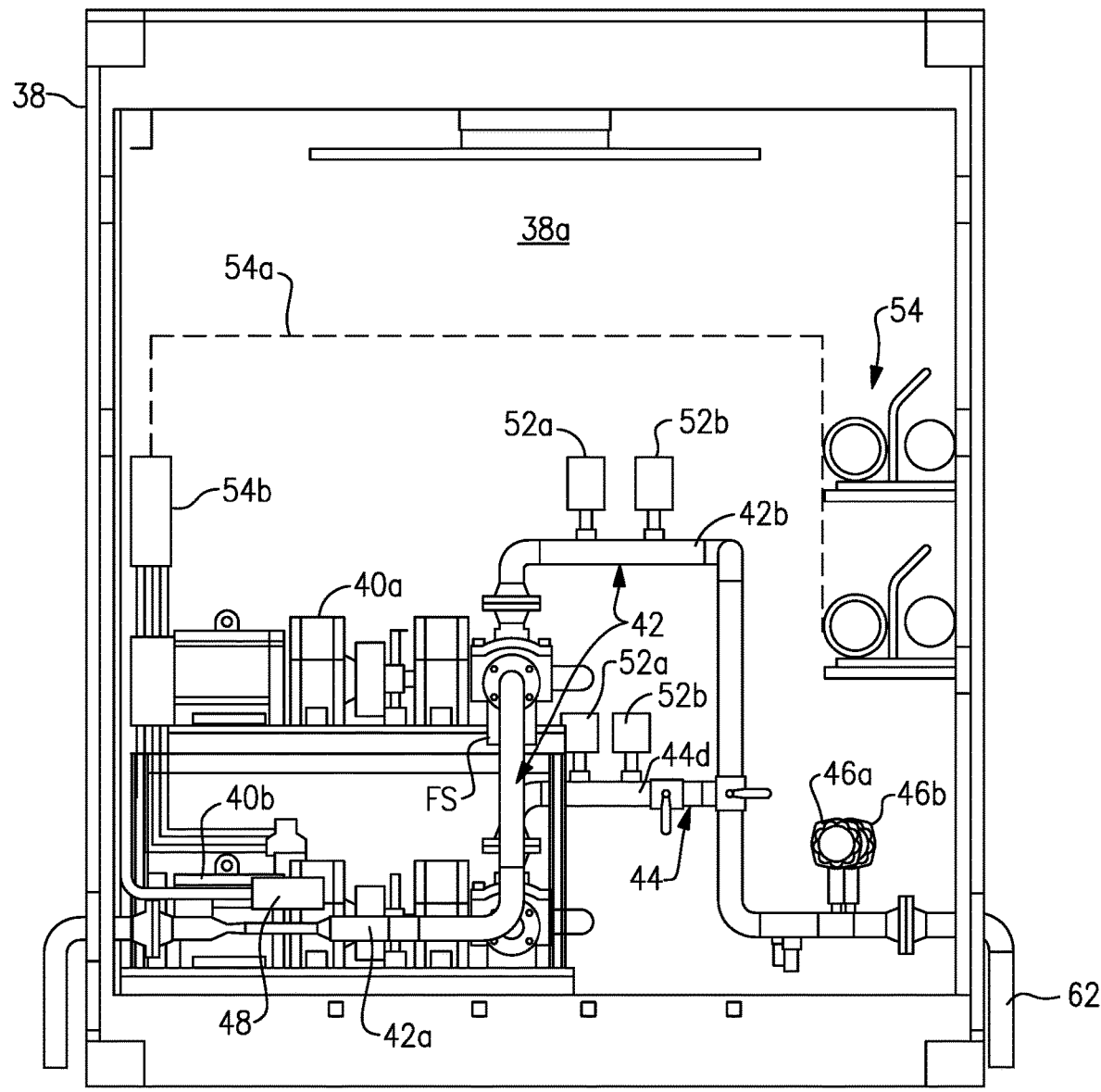
FIG. 3A illustrates a side view into an industrial compartment of the distribution station.
Figure 3B:
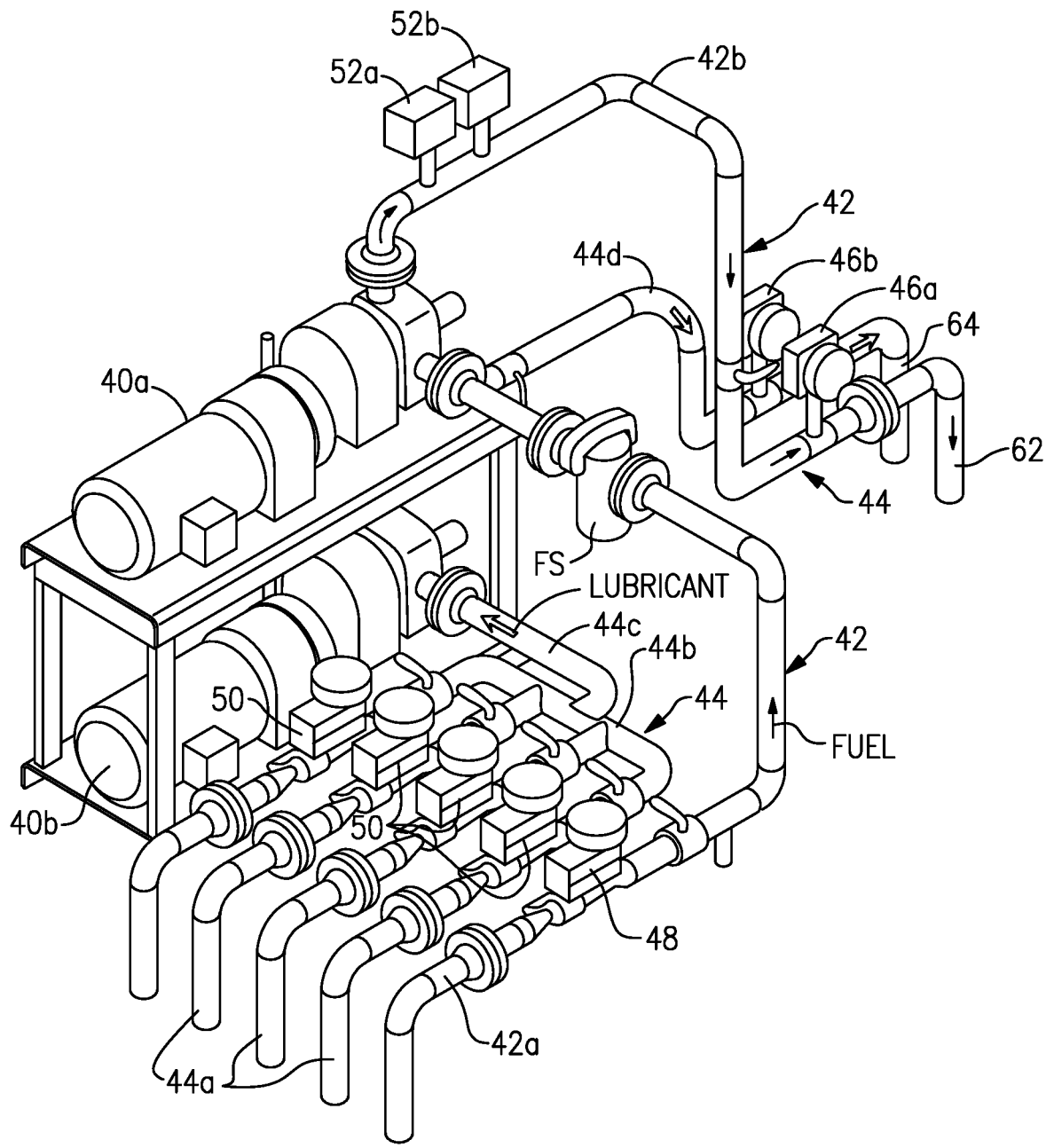
FIG. 3B illustrates an isolated view of the hardware in the industrial compartment.

The first compartment 38*a* houses the hardware for distributing the fuel and lubricants. FIG. 3A illustrates a view into the first compartment through the end 38*c* in which a portion of the hardware can be seen (some components may be blocked from view), and FIG. 3B illustrates an isolated view of the hardware. The first compartment 38*a* includes a fuel pump 40*a* and a lubricant pump 40*b*. The fuel pump 40*a* is disposed in a fuel line 42, and the lubricant pump 40*b* is disposed in a lubricant line 44. As used herein, the word "line" refers mainly to, but is not limited to, hard piping. Furthermore, a "line" may include multiple sections that are arranged in side-by-side or serial flow order. One or more fuel flow meters 46*a* are disposed in the fuel line 42 downstream of the fuel pump 40*a*, and one or more automated fuel valves 48 are disposed in the fuel line 42 upstream of the fuel pump 40*a*. One or more lubricant flow meters 46*b* are disposed in the lubricant line 44 downstream of the lubricant pump 40*b*, and one or more automated lubricant valves 50 is disposed in the lubricant line 44 upstream of the lubricant pump 40*b*. As an example, the flow meters 46*a*/46*b* may be, but are not limited to, turbine flow meters.

Figure 4:
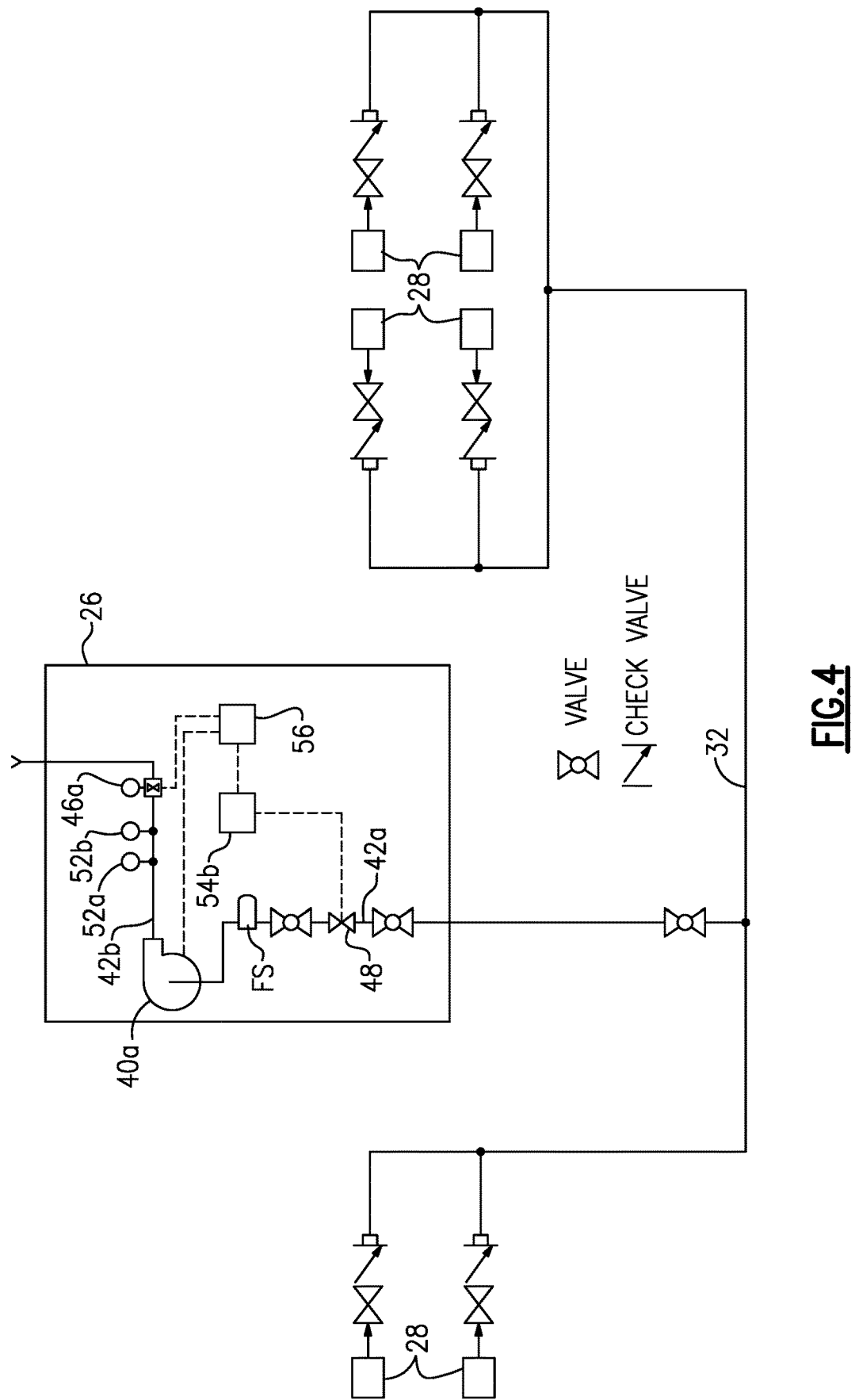
FIG. 4 is a piping diagram for the fuel.

The fuel line 42 in the illustrated example includes an inlet line 42*a* that leads into the upstream side of the fuel pump 40*a*, i.e., the suction side. The automated fuel valve 48 is disposed in the inlet line 42*a*, as well as a filter strainer FS. There may be manual valves, such as ball valves, upstream and downstream of the automated fuel valve 48 and, depending on line sizes, pipe reducers or expanders where appropriate. The fuel line 42 further includes a fuel outlet line 42*b* that is connected to the downstream side of the fuel pump 40*a*, i.e., the discharge side. The fuel flow meter 46*a* is disposed in the fuel outlet line 42*b*. In the illustrated example, the fuel line 42 is a singlet, in that it includes only a single fuel line inlet 42*a* that is connected to the fuel supply line network 32 (see FIG. 4) to handle a single input of fuel for dispensing. For instance, the fuel is drawn simultaneously from multiple fuel tanks 28 into a single line that is connected with the fuel inlet line 42*a*. FIG. 4 illustrates an example piping diagram from the fuel tanks 28 to the outlet line 42*b* in the distribution station 26.

Figure 5:
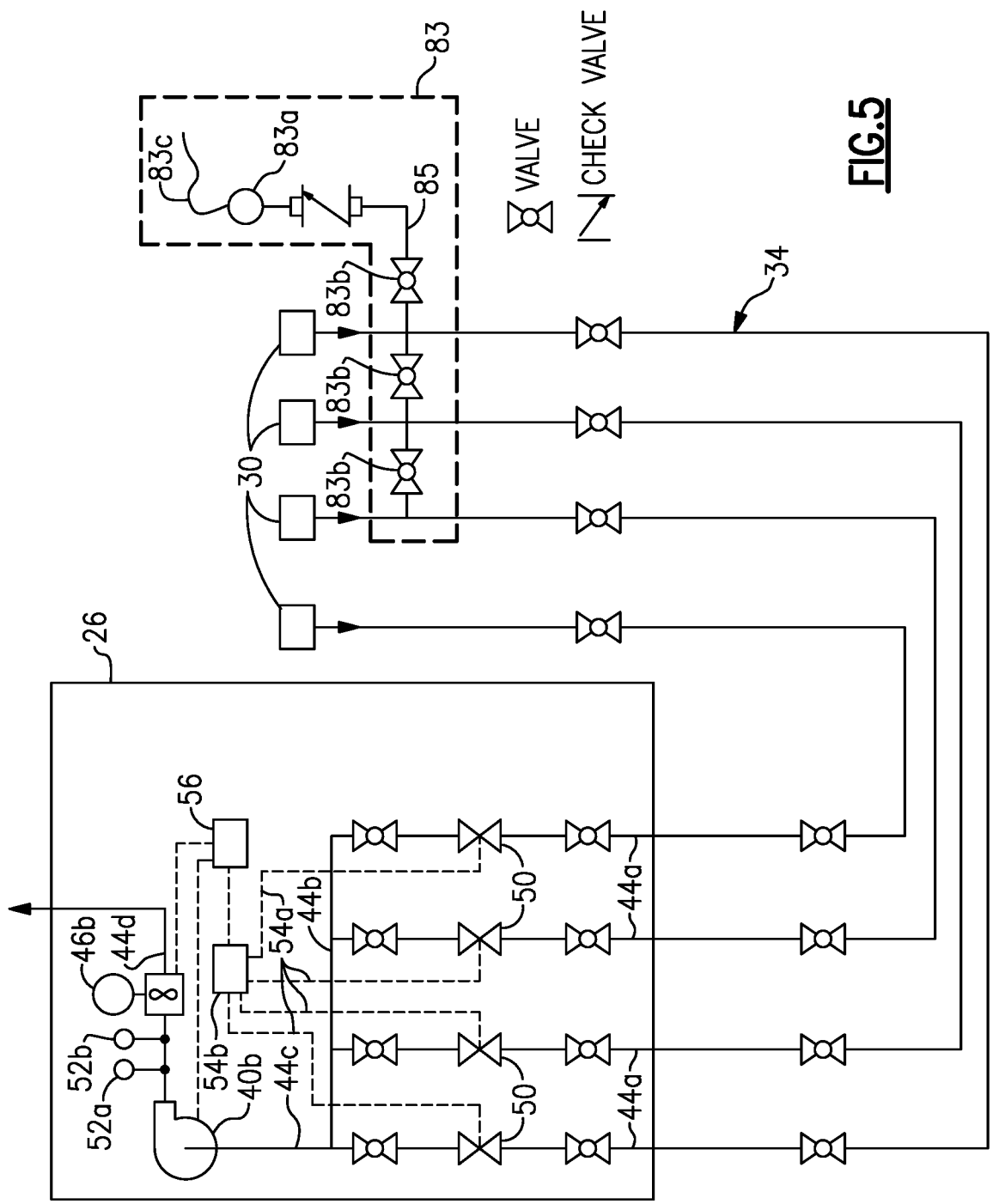
FIG. 5 is a piping diagram for the lubricant.

The lubricant line 44, on the other hand, is a multiplet, and in this example includes four lubricant inlet lines 44*a*. Each lubricant inlet line 44*a* is connected via the lubricant supply network 34 to one of the lubricant tanks 30. An automated lubricant valve 50 is disposed in each lubricant inlet line 44*a*. The lubricant line 44 further includes a manifold 44*b* that connects to the lubricant inlet lines 44*a* downstream of the automated lubricant valves 50. The lubricant line 44 then includes a connector line 44*c* that connects at a single outlet to the manifold 44*b*, and the connector line 44*c* is connected to an upstream side of the lubricant pump 40*b*. An outlet line 44*d* of the lubricant line 44 connects to a downstream side of the lubricant pump 40*b*, and the lubricant flow meter 46*b* is disposed in the outlet line 44*d*. There may be manual valves upstream and downstream of the automated lubricant valves 50 and, depending on line sizes, pipe reducers or expanders where appropriate. It is to be appreciated that in modified examples, such as where there is only a single lubricant, the lubricant line 44 may be a singlet that is configured like the fuel line 42. Conversely, the fuel line 42 may alternatively be configured as a multiplet like the lubricant line if there are multiple types of fuels. FIG. 5 illustrates an example piping diagram from the lubricant tanks 30 to the outlet line 44*d* in the distribution station 26. As will be appreciated from the diagrams and description, the fuel dispensing portion of the vessel 20 is fluidly isolated from the lubricant dispensing portion of the vessel 20 such that there is no location at which fuel and lubricant can mix.

As shown in FIG. 3B, the fuel line 42 and the lubricant line 44 may also include a temperature sensor 52*a* and a pressure sensor 52*b*. In this example, the sensors 52*a*/52*b* are disposed in the respective outlet lines 42*b*/44*d*.

The automated valves 48/50 may be electrical valves, such as solenoid valves, hydraulic valves, or pneumatic valves. In the illustrated example, the automated valves 48/50 are pneumatic valves that are connected with one or more air compressors 54 (see FIG. 3A), as represented by air tube 54*a*. An air distributor 54*b* may receive the air tube 54*a* and have outlet air tubes to each of the valves 48/50 to selectively distribute pressurized air to the valves 48/50. The distributor 54*b* may have internal valves that are configured to control which outlet air tubes air is provided to. If the valves are hydraulic, a hydraulic system analogous to the pneumatic system may be provided. If the valves are electric, the valves may be connected by a power cable to the generator 58 described below.

The fuel pump 40*a*, lubricant pump 40*b*, air distributor 54*b*, flow meters 46*a*/46*b*, sensors 52*a*/52*b* are electrically connected via electrical cables EC with a computerized controller 56 located in the second compartment 38*b*. The computerized controller 56, pumps 40*a*/40*b*, air compressor (s) 54, air distributor 54*b*, as well as any other electrical devices such as lights L and air conditioner AC, are also electrically connected by electric cables EC with a generator 58 mounted in the third compartment 38*c*. The computerized controller 56 may include hardware, such as a microprocessor, display, and memory, and software, which are programmed to carry out the functions described herein. As will be discussed in additional detail below, the distribution station 26 is configured to dispense fuel and lubricant on-demand to the patron vessels 22 and track the amounts of fuel and lubricant dispensed. As used herein, the term "on-demand" refers to dispensing of the fuel or lubricant only when there is a request or order for the fuel or lubricant, and "track" or variations thereof may refer to monitoring, tabulating, recording, or combinations of monitoring, tabulating, and recording.

Figure 6:
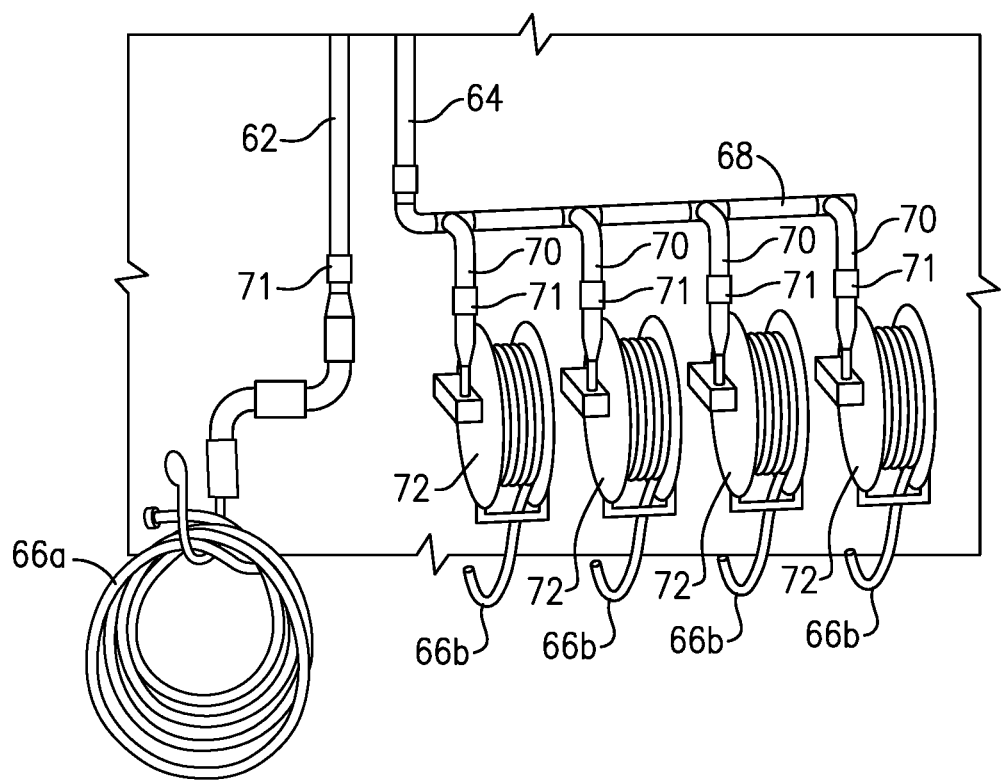
FIG. 6 is a magnified view of a portion of the marine distribution vessel, namely drop lines, reels, and hoses that are connected with the distribution station.

As shown in FIG. 2B, the outlet lines 42*b*/44*d* may extend near an access hole 60 in the container 38. The container 38 may have several such access holes, another one of which is used for the inlet lines 42*a*/44*a* to connect to the fuel and lubricant supply networks 32/34 of the barge 24. The fuel outlet line 42*b* connects to a fuel drop line 62, and the lubricant outlet line 44*d* connects to a lubricant drop line 64 (see also the magnified view in FIG. 6). The drop lines 62/64 extend down the side of the spacer container 37 in this example. The fuel drop line 62 is connected to a fuel hose 66*a*. The lubricant drop line 64 is connected to a reel manifold 68. Reel outlet lines 70 are connected off of the reel manifold 68. Hose reels 72 are connected with the respective reel outlet line 70, and lubricant hoses 66*b* are connected with the respective hose reels 72. Valves 71, such as manual valves, may be disposed in the outlet lines 70 and fuel drop line 62. The valves 71 permit each reel 72 and hose 66*b* to be isolated for lubricant delivery and permits the hoses 66*a*/66*b* to in essence be "turned on" or "shut off." The free ends of the hoses 66*a*/66*b* may include any of a variety of different connections, such as but not limited to, dry-connections, stinger connections, manual pump nozzles, or other connections known in the marine fueling field. Additionally, the connections may be interchangeable on a given hose 66*a*/66*b*, to accommodate different type of mating ports in the patron marine vessels 22. Although not shown, the lines herein may also be provided with drain cocks, drain valves, or other ports to permit flushing of lines (e.g., with air) and/or sampling of fuel or lubricants.

Turning now to the operation of the vessel 20 and distribution station 26, a patron vessel 22 in demand of fuel, lubricant, and/or water may moor alongside the barge 24. The barge 24 can accommodate two patron marine vessels 22, and possibly more depending on vessel size. The vessel 20 may not service all of the patron marine vessels 22 at once. For instance, only one patron marine vessel 22 may be serviced with fuel at one time, and only one patron marine vessel 22 may be serviced with lubricant at one time. Alternatively, a single patron marine vessel 22 can be serviced with fuel and with lubricant at one time. As indicated earlier in this disclosure, the vessel 20 may be transported to the points-of-sale at the location of the patron marine vessel 22, marinas, harbors, seaports, and temporary locations at which patron marine vessels 22 may access the barge 24. Servicing of the patron marine vessels 22 by the vessel 20 may be conducted while the vessels 20/22 are stopped/anchored or while the vessels 20/22 are moving.

Initially, the vessel 20 may receive an order or demand for fuel, lubricant, or both. The order may include information such as a designated amount of fuel needed and/or a designated amount of lubricant needed. Although not limited, the designated amounts may be determined from gauges on the patron marine vessel 22 and/or by manually gauging the instant fuel or lubricant levels, such as with a dipstick. The designated amounts may then be entered into the computerized controller 56 in the distribution station 26. The entry may be made manually by a tankerman that operates the vessel 22. The entry may be made through an input, such as a keyboard or a touchscreen of the computerized controller 56. The designated amounts may be entered with reference to other information associated with the owner or operator of the patron marine vessel 22, so that the owner or operator can be invoiced for the fuel and lubricant provided. If water is also ordered or provided from the water tank 35, the amount of water may also be entered into the computerized controller 56. Additionally or alternatively, some or all of the order information may be entered or handled from a remote terrestrial operating center that is in communication with the distribution station 26.

Pursuant to the order, the fuel hose 66a and one of the lubricant hoses 66b may be connected with an associated fuel tank port and lubricant tank port of the patron marine vessel 22. The lubricant hose 66b depends on which of the lubricants is ordered, as each hose 66b corresponds to a different one of the lubricant tanks 30. Once the hoses 66a/66b are connected to the patron marine vessels 22, fuel and lubricant dispensing may commence.

The start of dispensing is initiated in the distribution station 26 at the computerized controller 56 or alternatively remotely from the aforementioned operating center in communication with the computerized controller 56. For example, the tankerman may manually start the dispensing by initiating a start function in the computerized controller 56. Upon starting, the computerized controller 56 controls operation of the hardware in the first compartment 38a to deliver fuel and lubricant from the tanks 28/30 to the patron marine vessel 22. As will be appreciated, if only fuel or only lubricant is to be dispensed, only the hardware associated with fuel or lubricant will be activated.

As an example, the computerized controller 56 activates the pumps 40a/40b if they are not already activated. Depending on the power draw and capacity of the generator 58, the computerized controller 56 may stagger the start of the pumps 40a/40b. Starting the pump 40a or 40b can cause a temporary surge in power draw from the generator 58. As the pump 40a or 40b accelerates up to its rated speed, the surge may decay and level off at or near the rated power of the pump 40a or 40b. To avoid coinciding power surges that could exceed the capacity of the generator 58 if both pumps 40a/40b are started at the same time, the computerized controller 56 may stagger the starts.

Next, the computerized controller 56 causes the automated fuel valve 48 to open and one of the automated lubricant valves 50 to open. The automated lubricant valve 50 that is opened corresponds to the lubricant tank 30 that holds the type of lubricant that was ordered. For instance, if there are four different types of lubricants, type I, type II, type III, and type IV in the respective tanks 30, and type II is ordered, the valve 50 associated with the tank 30 that holds the type II is opened.

The pumps 40a/40b draw the fuel and the lubricant from the respective tanks 28/30. The fuel and lubricant flow through the respective networks 32/34, into the respective inlet lines 42a/44a, and then through the respective pumps 40a/40b. The fuel flows through the fuel outlet line 42b, and the fuel flow meter 46a measures flow and sends electronic signals representative of the flow rate back to the computerized controller 56. The lubricant flows through the lubricant outlet line 44d, and the lubricant flow meter 46b measures flow and sends electronic signals representative of the flow rate back to the computerized controller 56. The computerized controller 56 utilizes the flow rates to track in real-time the amount of fuel and the amount of lubricant dispensed. The fuel continues to flow through the drop line 62, through the fuel hose 66a, and then into the patron vessel 22. The lubricant continues to flow through the drop line 64, through the manifold 68, through the selected reel outlet line 70 and reel 72, then through the lubricant hose 66b to the patron vessel 22.

From the flow rate data provided by the flow meters 46a/46b, the computerized controller 56 tracks the running amount of fuel and lubricant dispensed to the patron marine vessel 22. When the tracked amounts of fuel and lubricant respectively reach the designated amounts of fuel and lubricant ordered, the computerized controller 56 responsively closes the automated fuel valve 48 and automated lubricant valve 50 to cease dispensing. The ceasing of the dispensing may alternatively be triggered remotely from the aforementioned operating center in communication with the computerized controller 56. The valves 71 may also be closed and the hoses 66a/66b disconnected from the patron vessel 22. If the patron marine vessel 22 also ordered a second lubricant, the above process may be repeated for the second lubricant.

Alternatively, prior to closing the valves 71 and disconnecting the hoses 66a/66b from the patron marine vessel 22, the fuel and lubricant levels of the patron marine vessel 22 may be checked. If an additional amount of fuel and/or lubricant is needed, additional smaller designated amounts of fuel and/or lubricant may be entered into the computerized controller 56 for "topping-off" the patron marine vessel. Additionally, the potential for over-filling can be reduced by initially conservatively choosing the designated amounts of fuel and lubricant to be lower than the maximum amounts that the patron marine vessel 22 needs, then checking the fuel and lubricant levels in the patron marine vessel 22 to verify how much more (if any) fuel and lubricant may be needed, and then dispensing one or more smaller designated amounts to reach the desired levels. Subsequently, the owner or operator of the patron marine vessel 22 may be invoiced for the amounts of fuel and/or lubricant provided. Such invoicing may be conducted digitally in real-time or at a later time from the computerized controller 56 or remote operating center.

As will be appreciated from the above-described configuration and operation, the lubricants are dispensed through common stretches of the lubricant line 44 (i.e., the manifold 44b, connector line 44c, and lubricant outlet line 44d), as well as the drop line 64 and reel manifold 68. The configuration, however, permits only a single lubricant flow meter 46b to be used to track flow of each lubricant, since all lubricants are dispensed through the outlet line 44d. Since the inlet and outlet side of the flow meter each require a joint connection, reducing the number of flow meters in the system facilitates a reduction in the number of joint connections, thereby also reducing the number of potential leak points, as well as saving the cost of additional flow meters. And while there may be residual lubricant in the common lines that mixes with the next lubricant dispensed, the extent of common line is minimal such that only relatively low, inconsequential amounts would be mixed. The reel manifold 68 further facilitates reduced mixing in that the valves 71 can be used to fluidly isolate the reels 72 and hoses 66b from each other so that the extent of the reels 72 and hoses 66b does not contribute to any mixing.

The computerized controller 56 may also be configured with one or more automated shut-down schemes. For example, the computerized controller 56 may receive temperature and/or pressure data from the temperature sensors 52a and the pressure sensors 52b. The computerized controller 56 may be configured with threshold temperatures and/or pressures. The thresholds may be pre-designated with respect to system limits, and the computerized controller 56 may shut-down one or more components in the system in response to a temperature and/or pressure of the fuel and/or lubricants exceeding the pre-designated thresholds. For instance, if the lubricant temperature and/or pressure exceeds the pre-designated limits, the computerized controller 56 de-activates the lubricant pump 40b and closes any of the automated lubricant valves 50 that are open. Likewise, if the fuel temperature and/or pressure exceeds the pre-designated limits, the computerized controller 56 de-activates the fuel pump 40a and closes the automated fuel valves 48. The computerized controller 56 may also activate an alert on the display that is indicative of the shut-down and/or send an alert to the remote operating center. Such shut-downs may alternatively be triggered manually by the tankerman or from the remote operating center.

Referring again to FIG. 5, the vessel 20 may further include an auxiliary lubricant system 83 connected with the lubricant tanks 30. In this example, the auxiliary lubricant system 83 includes an auxiliary lubricant pump 83a outside of the distribution station 26. The pump 83a is connected with an auxiliary lubricant line 85 that is connected with the lubricant supply line network 34. There are also one or more auxiliary lubricant valves 83b, such as but not limited to ball valves, disposed in the auxiliary lubricant line 85.

The auxiliary lubricant system 83 is a "redundant," analog system. In the event that the distribution station 26 cannot be used to dispense lubricant, such as if the distribution station 26 is under maintenance, the auxiliary lubricant system 83 can temporarily be used to dispense lubricant. For instance, the valves 83b are selectively opened or closed such that the auxiliary lubricant pump 83a can draw lubricant from one of the desired lubricant tanks 30. The lubricant may be pumped through an auxiliary hose 83c that is connected to the patron marine vessel 22. The auxiliary lubricant system 83 is an analog system and the amount of lubricant provided through the auxiliary lubricant system 83 is not tracked by the distribution station 26. For example, the tankerman may manually enter the amount provided into the computerized controller 56 for invoicing purposes.

Figure 7:
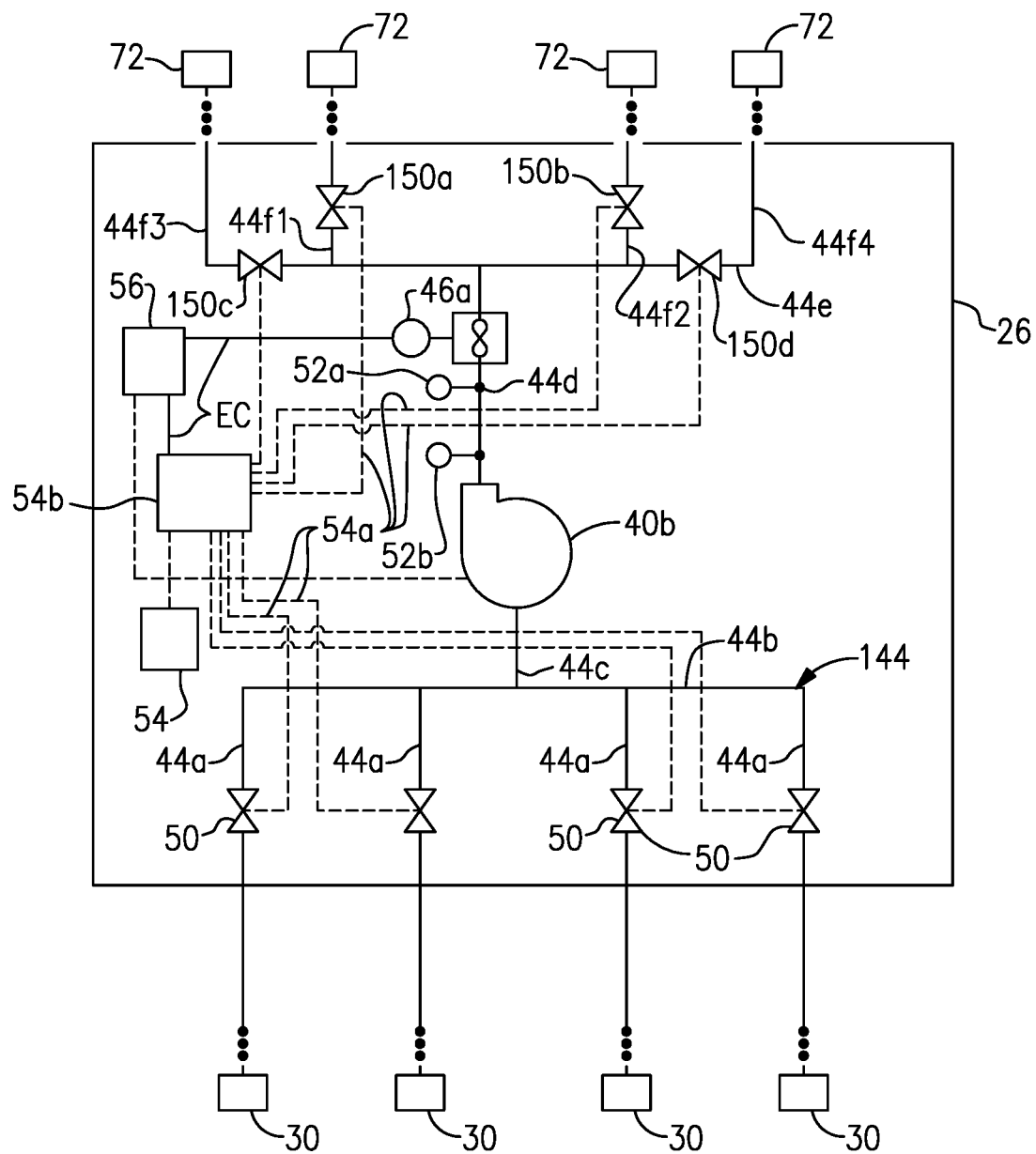
FIG. 7 illustrates modified example of a hardware configuration in the distribution station.

FIG. 7 is a piping diagram that is similar to FIG. 5 but shows an example of a modified configuration of a lubricant line 144 in the distribution station 26. In this disclosure, like reference numerals designate like elements where appropriate and reference numerals with the addition of one-hundred or multiples thereof designate modified elements that are understood to incorporate the same features and benefits of the corresponding elements. The piping from the lubricant tanks 30 to the distribution station 26 may be the same as shown in FIG. 5 and is therefore not shown in this view. In this example, the hardware configuration is the same as the configuration in FIG. 5 with respect to the lubricant inlets 44a, automated lubricant valves 50, manifold 44b, connector line 44c, lubricant pump 40b, lubricant outlet 44d, pressure and temperature sensors 52a/52b, and lubricant flow meter 46a. In this example, however, the lubricant line 144 further includes a manifold 44e downstream of the lubricant pump 40b that connects to the outlet line 44d. The lubricant line 144 additionally includes manifold outlet lines 44f1/44f2/44f3/44f4 that connect off of the manifold 44e. Here, the lubricant line 144 includes one manifold outlet line 44f1/44f2/44f3/44f4 for each type of lubricant, i.e., one manifold outlet line 44f1/44f2/44f3/44f4 for each lubricant tank 30. The manifold outlet lines 44f1/44f2/44f3/44f4 are connected to the reels 72 and hoses 66b (not shown). For instance, each manifold outlet line 44f1/44f2/44f3/44f4 may be connected to a respective one of the reels 72 by a drop line, similar to the aforementioned drop line 64.

Additional automated lubricant valves 150a/150b/150c/150d control lubricant flow through the manifold 44e and manifold outlet lines 44f1/44f2/44f3/44f4. In the illustrated example, the automated lubricant valves 150a/150b are disposed in respective different manifold outlet lines 44f1/44f2 and automated lubricant valves 150c/150d are disposed in the manifold 44e. In the illustrated configuration, the automated lubricant valves 150a/150b are disposed in the first two manifold outlet lines 44f1/44f2 that are closest to the connection with the outlet line 44d, and the automated lubricant valves 150c/150d are disposed in the manifold 44e after, or downstream of, the locations where the first two manifold outlet lines 44f1/44f2 connect to the manifold 44e. The automated lubricant valve 150a controls lubricant flow through the manifold outlet line 44f1, the automated lubricant valve 150b controls lubricant flow through the manifold outlet line 44f2, automated lubricant valve 150c controls lubricant flow through the manifold outlet line 44f3, and the automated lubricant valve 150d controls lubricant flow through the manifold outlet line 44f4. That is, the automated lubricant valves 150a/150b/150c/150d have a one-for-one correspondence to the manifold outlet lines 44f1/44f2/44f3/44f4 such that each individual manifold outlet line 44f1/44f2/44f3/44f4 can be isolated to provide lubricant flow without flow through the other manifold outlet lines 44f1/44f2/44f3/44f4. As will be appreciated, additional automated lubricant valves may be used to further isolate portions of the lubricant line 144 during dispensing of a lubricant, although such additional automated lubricant valves may add cost and control complexity if two or more automated lubricant valves are to be opened at once.

Similar to the automated lubricant valves 50, the automated lubricant valves 150a/150b/150c/150d may be electrical valves, such as solenoid valves, hydraulic valves, or pneumatic valves. In the illustrated example, the automated lubricant valves 150a/150b/150c/150d are pneumatic valves that are connected with the one or more air compressors 54 via the air lines 54a and air distributor 54b, which is electrically connected to the computerized controller 56 as previously described.

The computerized controller 56 is configured to control opening and closing of the automated lubricant valves 50/150a/150b/150c/150d to provide lubricant flow through the manifold outlets 44f1/44f2/44f3/44f4 to the respective reels 72 and hoses 66b. Assuming the automated lubricant valves 150a/150b/150c/150d are initially closed, in one example control scheme, the controller 56 opens only one of the automated lubricant valves 150a/150b/150c/150d to provide lubricant to the corresponding manifold outlet 44f1/44f2/44f3/44f4 and its associated reel 72 and hose 66b. In this manner, lubricant flow to each reel 72 and its hose 66b are individually controlled. Moreover, configuration may also facilitate reducing the amount of common stretches of the lubricant line 144, as the common stretches here are limited to the volumes of the lubricant line 144 between the automated lubricant valves 50 and the automated lubricant valves 150a/150b/150c/150d.

As mentioned earlier, the distribution station 26 is also elevated above the deck 24b of the barge 24. The purpose of such a configuration is to locate the distribution station 26, and namely its industrial electronic devices, outside of a defined spatial region 80 of the barge 24 which would otherwise require stringent ventilation measures to ensure that any fuel vapors do not accumulate near industrial electric devices.

The spatial region 80 is illustrated in an overhead view of the vessel 20 in FIG. 8A and in a side view of the vessel 20 in FIG. 8B. The spatial region 80 is comprised of several spatial sub-regions, including first sub-region 80a, second sub-region 80b, and third sub-region 80c. The first sub-region 80a is a spherical spatial sub-region of a radius of at least 33 feet defined about the vent 28b, namely the point of release of the vent 28b. The second sub-region 80b is a (vertical) cylindrical spatial sub-region of a radius of at least 16 feet defined about the pressure relief valve 28c, namely the point of release of the valve 28c. The third sub-region 80c is a sub-region from the deck 24b up to a height of at least 10 feet, which namely encompasses locations that are at least 10 feet away from any hatch H to the fuel tanks 28. It is to be appreciated that the configuration of the spatial region 80 and sub-regions 80a/80b/80c may vary depending on the location of the referenced vent 28c, valve 28c, and hatches H, as well as the size and configuration of the barge 24.

The spatial region 80 limits the location where the industrial electronic devices can be located without employing stringent ventilation measures, and thus also limits the location of the distribution station 26. In this regard, the distribution station 26 is mounted in the elevated position above the 10 foot height of the sub-region 80c and outside of the sub-regions 80a and 80b. In the examples illustrated herein, the spacer container 37 serves to elevate the distribution station 26 to the desired location, i.e., the spacer container 37 and the container 38 of the distribution station 26 are stacked. It is to be understood, however, that the elevation is not limited to the spacer container 37 and that other support structures can alternatively be used, such as but not limited to, stanchions, beams, mezzanines, or the like.

Figure 9A:
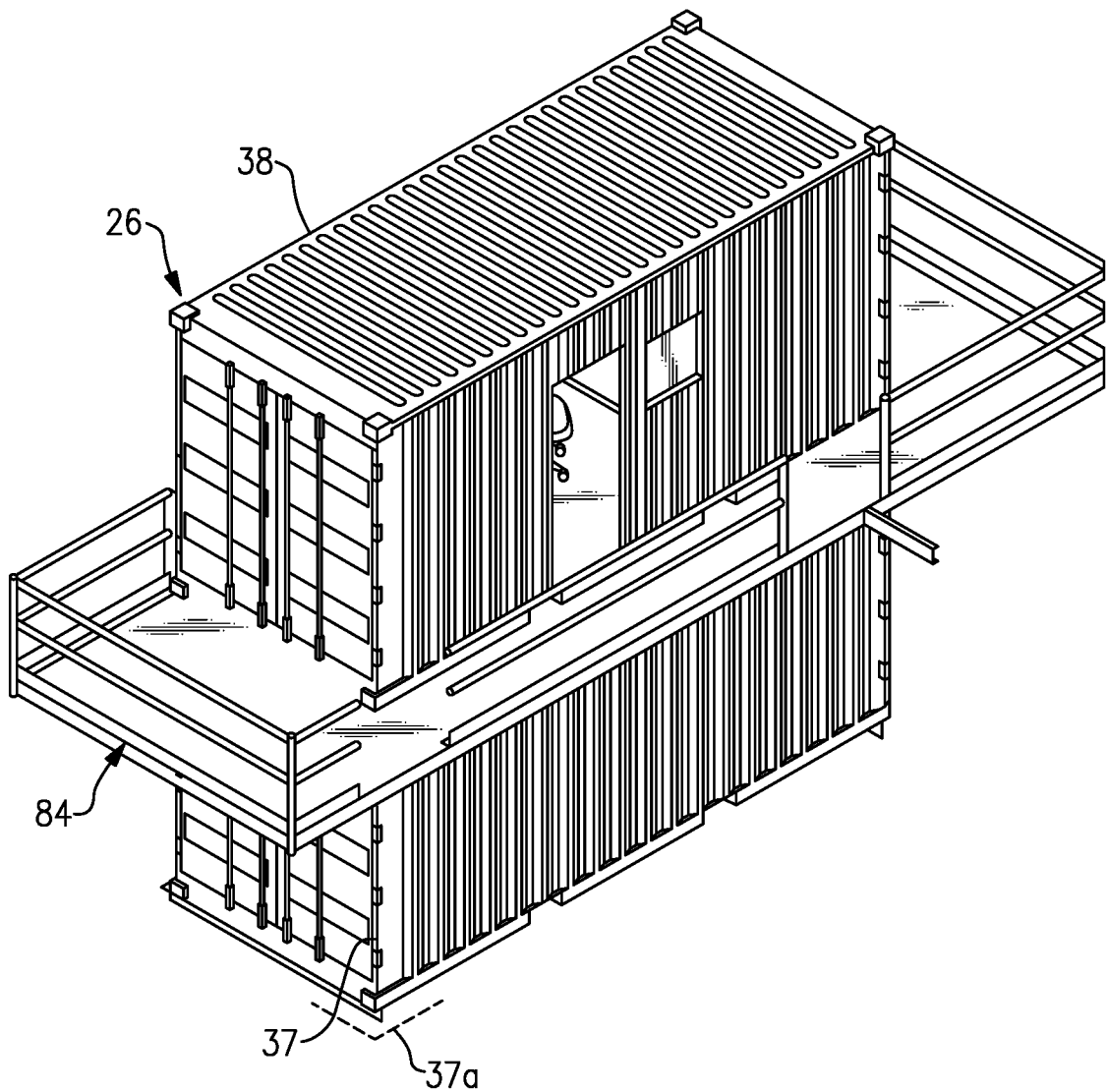
FIG. 9A illustrates a stack of a distribution station and spacer container.
Figure 9B:
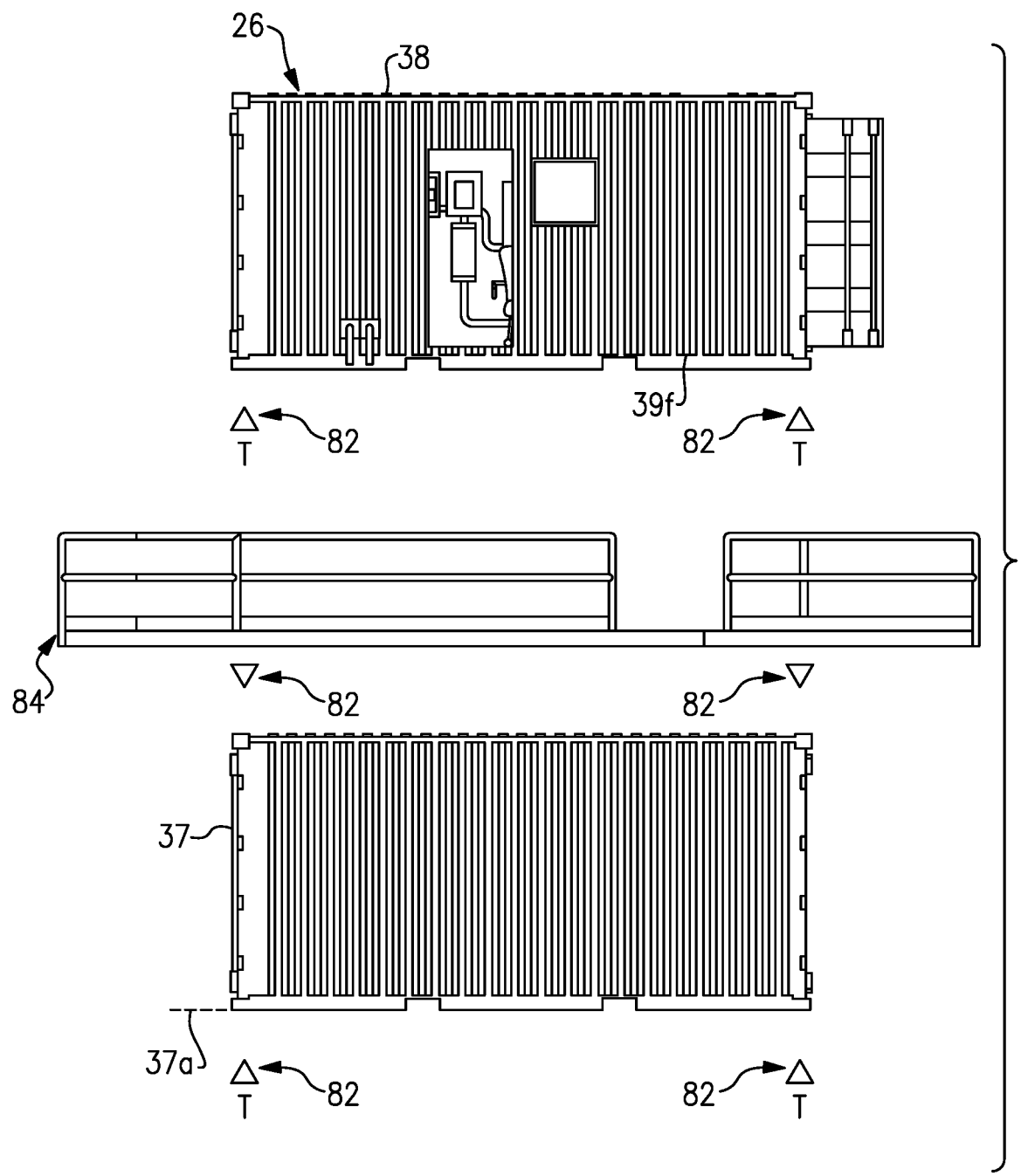
FIG. 9B illustrates an expanded view of the stack of FIG. 9A.

FIG. 9A illustrates an isolated view of this stacked arrangement, and FIG. 9B illustrates an expanded view of the stack. The spacer container 37 is of substantially similar or identical construction as the container 38 to facilitate stacking. The spacer container 37 defines a bottom-most plane 37a, which is the plane that is flush or substantially flush with the deck 24b of the barge 24. For instance, the bottom-most plane 37a may be flush with the floor of the spacer container 37 or, if the spacer container 37 has feet, flush or substantially flush with the feet. In one example, the floor 39f of the container 38 is at least 10 feet above the bottom-most plane 37a. It is to be understood that in some instances, intermediate hardware, other intermediate structures, or lack of intermediate hardware or structures may vary the distance somewhat between the bottom-most plane 37a and the floor 39f. However, given any variations in construction, the floor 39f is at least 10 feet above the deck 24b of the barge 24, which will also most typically coincide with being 10 feet above the bottom-most plane 37a.

In some instances, the height of the containers 37/38 alone may not be sufficient to elevate the container 38 above the desired 10 foot level above the deck 24b. In that case, as shown in FIG. 9B, spacers 82 may be used in the stack to further elevate the container 38 beyond the height of the spacer container 37. Such spacers 82 may also serve to facilitate securing the stack together. As an example, the spacers 82 may be or may include twist locks that serve both to further elevate the container 38 and secure the container 38 in place.

A balcony 84 may also be incorporated into the stack and may serve as an additional spacer to elevate the container 38. In the example shown, the balcony 84 surrounds the container 38 on three sides and connects the two exterior end doors D and side entry door ED. As a result, the tankerman or other operator can readily access each of the compartments 38a/38b/38c without climbing up and down to each compartment 38a/38b/38c. If needed, the balcony 84 can alternatively surround the container 38 on all four sides to provide access to all sides or, if the doors are configured in different locations than in the examples, the balcony 84 can be configured in such a way as to connect all of the doors.

The design of the distribution station 26 in the form of the container 38 also permits the distribution station 26 to be provided as a pre-fabricated module. The module can be built at a remote site and then transported to the barge 24 for final assembly thereon. This may further permit a distribution station 26 to be later replaced with a substitute distribution station 26 and distribution stations 26 to be swapped in and out from different barges. In this regard, the distribution station (module) 26 is designed to have two states, namely a cargo-worthy state and an operational state. In the cargo-worthy state, the distribution station 26 is, or can be, certified for cargo shipping. This means that the distribution station 26 is structurally sound and is weather-tight. As an example, in the cargo-worthy state, shown in FIG. 10, the container 38 includes panels 86 that are affixed over the access holes 60 in the container 38. For instance, the panels 86 are metal panels that are welded or otherwise attached in a sealed manner over the access holes 60, ensuring that the access holes 60 are weather-tight. The panels 86 may be of relatively low-profile so as to avoid substantially projecting out from the container 38 or increasing the dimensional profile of the container 38. Similar panels 86 may also be provided over the side entry door ED and any windows in the container 38. Additionally, if there are any external features that serve for the functionality of the distribution station 26, such as but not limited to, external lights, brackets for accommodating personal protective equipment, fire extinguishers, antennae or communication devices, or the like, these are removed and may be securely stored inside of the container 38 or shipped separately.

Once transported to the barge 24, the distribution station 26 is converted from the cargo-worthy state to the operational state by mounting the distribution station 26 on the barge 24 and connecting the distribution station 26 with the fuel tanks 28, lubricant tanks 30, and hoses 66a/66b. The mounting may be conducted by securing the distribution station 26 on the spacer container 37, such as by securing the twist locks. The panels 86 may be removed and connections made between the fuel inlet 42a and the fuel supply network 32 and between the lubricant inlets 44a and the lubricant supply network 34. As an example, the connections may be made by welding pipe ends together or by attached flanged connector ends. The converting may also further include connecting the fuel hose 66a with the fuel line 42 and connecting the lubricant hoses 66b with the lubricant line 44. The fuel side connections can be made by joining the hose 66a with the drop line 62 and joining the drop line 62 with the fuel line 42 of the distribution station 26. The lubricant side connections can be made by connecting the hoses 66b with the reels 72, joining the reels 72 with the outlet lines 70, manifold 68, and drop line 64, and joining the drop line 64 with the lubricant line 44 in the distribution station 26. The joints may be welded or flanged, for example. All connections outside of the container 38 may be fully or partially fabricated on the barge 24 prior to or after the arrival of the distribution station 26 to the barge 24.

Once all connections have been made to convert the distribution station 26 into the operational state, the distribution station 26 is operated as described above to dispense fuel and lubricant on-demand to the patron marine vessels 22 and track the amounts of fuel and lubricant dispensed.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A marine distribution vessel comprising:
   a barge having a plurality of fuel tanks and a plurality of lubricant tanks; and
   a distribution station disposed on the barge and connected with the fuel tanks and the lubricant tanks, the distribution station including,
      a fuel pump and a fuel line connecting the fuel tanks with the fuel pump,
      a lubricant pump and lubricant lines connecting the lubricant tanks with the lubricant pump,
      a fuel flow meter disposed in the fuel line,
      an automated fuel valve disposed in the fuel line upstream of the fuel pump,
      a lubricant flow meter disposed in the lubricant lines,
      a plurality of automated lubricant valves disposed in the lubricant lines upstream of the lubricant pump, and
      a computerized controller electrically connected with the fuel flow meter, the lubricant flow meter, the automated fuel valve, the automated lubricant valves, the fuel pump, and the lubricant pump, wherein the computerized controller is configured to receive an input of a designated amount of fuel to be dispensed, activate the fuel pump in response to the received input of the designated amount of fuel to be dispensed, open the automated fuel valve to start dispensing fuel in response to the received input of the designated amount of fuel to be dispensed, and close the automated fuel valve in response to a tracked amount of fuel reaching the designated amount of fuel.

2. The marine distribution vessel as recited in claim 1, wherein the lubricant lines include a plurality of inlet lines upstream of the lubricant pump, and the automated lubricant valves are disposed in the inlet lines.

3. The marine distribution vessel as recited in claim 2, wherein the lubricant lines further include a first manifold connected with the inlet lines, and the manifold is downstream of the automated lubricant valves and upstream of the lubricant pump.

4. The marine distribution vessel as recited in claim 3, wherein the lubricant lines further include a single connector line to which the first manifold is connected, and the connector line is connected to an upstream side of the lubricant pump.

5. The marine distribution vessel as recited in claim 4, wherein the lubricant lines further include an outlet line connected to a downstream side of the lubricant pump, and the lubricant flow meter is disposed in the outlet line.

6. The marine distribution vessel as recited in claim 5, further comprising a lubricant drop line connected with the outlet line, a reel manifold connected with the lubricant drop line, reel outlet lines connected off of the reel manifold, hose reels connected with the reel outlet lines, and lubricant hoses connected with the hose reels.

7. The marine distribution vessel as recited in claim 5, wherein the lubricant lines further include a second manifold connected with the outlet line.

8. The marine distribution vessel as recited in claim 7, wherein at least one of the automated lubricant valves is disposed in the second manifold.

9. The marine distribution vessel as recited in claim 8, wherein the lubricant lines further include manifold outlet lines connected off of the second manifold, and at least one of the automated lubricant valves is disposed in at least one of the manifold outlet lines.

10. The marine distribution vessel as recited in claim 7, wherein at least two of the automated lubricant valves are disposed in the second manifold.

11. The marine distribution vessel as recited in claim 10, wherein the lubricant lines further include manifold outlet lines connected off of the second manifold, and at least two of the automated lubricant valves are disposed in different ones of the manifold outlet lines.

12. The marine distribution vessel as recited in claim 11, wherein the computerized controller is configured to open and close the automated lubricant valves to isolate any individual one of the manifold outlet lines for lubricant flow.

13. The marine distribution vessel as recited in claim 1, wherein the distribution station further includes an air compressor and an distributor electrically connected with the computerized controller and with the air compressor, and the automated fuel valve and the automated lubricant valves are pneumatic valves the are connected by air lines with the air distributor.

14. The marine distribution vessel as recited in claim 1, wherein the computerized controller is configured to receive an input of a designated amount of lubricant to be dispensed, activate the lubricant pump in response to the received input of the designated amount of lubricant to be dispensed, open the automated lubricant valve to start dispensing lubricant in response to the received input of the designated amount of lubricant to be dispensed, and close the automated lubricant valve in response to a tracked amount of lubricant reaching the designated amount of lubricant.

15. The marine distribution vessel as recited in claim 13, wherein the computerized controller is configured to operate the distributor to open the automated fuel valve to start dispensing fuel in response to the received input of the designated amount of fuel to be dispensed.

16. A marine distribution vessel comprising:
   a barge having a plurality of fuel tanks and a plurality of lubricant tanks; and
   a distribution station disposed on the barge and connected with the fuel tanks and the lubricant tanks, the distribution station including,
      a fuel pump and a fuel line connecting the fuel tanks with the fuel pump,
      a lubricant pump and lubricant lines connecting the lubricant tanks with the lubricant pump, the lubricant lines including a first manifold upstream of the lubricant pump, a second manifold downstream of the lubricant pump, and a plurality of manifold outlet lines connected off of the second manifold,
      a fuel flow meter disposed in the fuel line,
      an automated fuel valve disposed in the fuel line,
      a lubricant flow meter disposed in the lubricant lines, a plurality of automated lubricant valves disposed in the lubricant lines, wherein at least a portion of the automated lubricant valves are disposed downstream of the lubricant pump, and a computerized controller electrically connected with the fuel flow meter, the lubricant flow meter, the automated fuel valve, the automated lubricant valves, the fuel pump, and the lubricant pump, wherein the computerized controller is configured to start the fuel pump and the lubricant pump and, when both the fuel pump and the lubricant pump are to be started, stagger the starts of the fuel pump and the lubricant pump; and a plurality of lubricant hoses connected downstream of the manifold outlet lines.

17. The marine distribution vessel as recited in claim 16, wherein the lubricant lines include a plurality of inlet lines upstream of the lubricant pump, and a portion of the automated lubricant valves are disposed in the inlet lines.

18. The marine distribution vessel as recited in claim 16, wherein the lubricant lines further include an outlet line connected to a downstream side of the lubricant pump, and the lubricant flow meter is disposed in the outlet line.

19. The marine distribution vessel as recited in claim 16, wherein at least one of the automated lubricant valves is disposed in the second manifold.

20. The marine distribution vessel as recited in claim 16, wherein at least one of the automated lubricant valves is disposed in at least one of the manifold outlet lines.

21. The marine distribution vessel as recited in claim 16, wherein at least one of the automated lubricant valves is disposed in the second manifold, and at least one of the automated lubricant valves is disposed in at least one of the manifold outlet lines.

22. The marine distribution vessel as recited in claim 16, wherein the computerized controller is configured to open and close the automated lubricant valves to isolate any individual one of the manifold outlet lines for lubricant flow.

23. The marine distribution vessel as recited in claim 16, further comprising a generator electrically connected with the fuel pump, the lubricant pump, and the controller, the generator is operable to power the fuel pump, the lubricant pump, and the controller, and the staggering of the starts of the fuel pump and the lubricant pump avoids coinciding power surges in power draw from the generator.

24. A marine distribution vessel comprising:
a barge having a plurality of fuel tanks and a plurality of lubricant tanks; and
a distribution station disposed on the barge and connected with the fuel tanks and the lubricant tanks, the distribution station including,
a fuel dispensing system connected with the fuel tanks and a lubricant dispensing system connected with the lubricant tanks, wherein the fuel dispensing system is fluidly isolated from the lubricant dispensing system,
the fuel dispensing system including,
a fuel pump and a fuel line connecting the fuel tanks with the fuel pump,
a fuel flow meter disposed in the fuel line,
an automated fuel valve disposed in the fuel line,
the lubricant dispensing system including,
a lubricant pump and lubricant lines connecting the lubricant tanks with the lubricant pump,
a lubricant flow meter disposed in the outlet line,
a plurality of automated lubricant valves disposed in the inlet lines,
a computerized controller electrically connected with the fuel dispensing system and the lubricant dispensing system, the computerized controller being configured to dispense fuel and lubricant on-demand to patron marine vessels and track amounts of fuel and lubricant dispensed, and
a generator electrically connected with the fuel pump, the lubricant pump, and the computerized controller, the generator operable to power the fuel pump, the lubricant pump, and the computerized controller.

25. The marine distribution vessel as recited in claim 24, wherein the lubricant lines include a plurality of lubricant inlet lines upstream of the lubricant pump, a manifold connected with the lubricant inlet lines, and a lubricant outlet line connected to a downstream side of the lubricant pump.

26. The marine distribution vessel as recited in claim 25, wherein the lubricant outlet line includes at least one of a pressure sensor in electric communication with the computerized controller or a temperature sensor in electric communication with the computerized controller.

27. The marine distribution vessel as recited in claim 26, wherein the computerized controller is configured to deactivate the lubricant pump in response to a pressure or temperature that exceeds, respectively, a pre-designated threshold pressure or temperature.

28. The marine distribution vessel as recited in claim 24, wherein the fuel line includes a fuel outlet line connected to a downstream side of the fuel pump, and the fuel outlet line includes at least one of a pressure sensor in electric communication with the computerized controller or a temperature sensor in electric communication with the computerized controller.

29. The marine distribution vessel as recited in claim 28, wherein the computerized controller is configured to deactivate the fuel pump in response to a pressure or temperature that exceeds, respectively, a pre-designated threshold pressure or temperature.

* * * * *